United States Patent
Mangino et al.

(10) Patent No.: US 7,869,984 B2
(45) Date of Patent: Jan. 11, 2011

(54) SYSTEM AND METHOD FOR SIMULATING A DISCRETE EVENT PROCESS USING BUSINESS SYSTEM DATA

(75) Inventors: Kimberley Marie Mangino, Niskayuna, NY (US); Corey Nicholas Bufi, Troy, NY (US); Brian Nathan Dingman, Gloversville, NY (US); Snehil Gambhir, Gurgaon (IN)

(73) Assignee: General Electric Company, Schenectady, NY (US)

( * ) Notice: Subject to any disclaimer, the term of this patent is extended or adjusted under 35 U.S.C. 154(b) by 627 days.

(21) Appl. No.: 11/753,858

(22) Filed: May 25, 2007

(65) Prior Publication Data

US 2007/0282581 A1 Dec. 6, 2007

Related U.S. Application Data

(63) Continuation of application No. 10/222,894, filed on Aug. 19, 2002, now Pat. No. 7,533,008.

(51) Int. Cl.
G06F 11/34 (2006.01)
(52) U.S. Cl. .............................. 703/6; 705/11
(58) Field of Classification Search .................... 703/6; 705/11
See application file for complete search history.

(56) References Cited

U.S. PATENT DOCUMENTS 4,604,718 A 8/1986 Norman et al.
5,111,391 A 5/1992 Fields et al.
5,487,131 A 1/1996 Kassatly et al.
5,781,442 A 7/1998 Engleson et al.

(Continued)

FOREIGN PATENT DOCUMENTS

EP 1271386 B1 8/2005

(Continued)

OTHER PUBLICATIONS

Russell C.H. Cheng, Wayne Holland, Neil A. Hughes, "Selection of Input Models Using Bootstrap Goodness-of-Fit" Proceedings of the 1996 Winter Simulation Conference, pp. 199-206.

(Continued)

*Primary Examiner*—Dwin M Craig
(74) *Attorney, Agent, or Firm*—McAndrews, Held & Malloy, Ltd.; Michael A. Dellapenna

(57) ABSTRACT

The invention provides a method and system to simulate a process of discrete tasks having a plurality of available resources associated therewith. The system may comprise a model database to store a plurality of models, each model including a plurality of task and resource parameters; a model portion in communication with the model database and configured to receive commands from a user, to retrieve one of the plurality of models and corresponding task and resource parameters in response to a user command, to receive input data corresponding to attributes of one or more task and resource parameters from a business database system, and to generate a simulation model based on the selected business database system and the input data; and a model server to perform a simulation of the process by processing the simulation model and to generate an output data file containing output data representative of the simulation.

12 Claims, 30 Drawing Sheets

Define Relationships Between Systems

U.S. PATENT DOCUMENTS

| | | | |
|---|---|---|---|
| 5,809,477 | A | 9/1998 | Pollack |
| 5,890,133 | A | 3/1999 | Ernst |
| 6,151,581 | A * | 11/2000 | Kraftson et al. ............... 705/3 |
| 6,167,564 | A | 12/2000 | Fontana et al. |
| 6,275,825 | B1 * | 8/2001 | Kobayashi et al. ............ 707/9 |
| 6,442,515 | B1 | 8/2002 | Varma et al. |
| 6,738,682 | B1 | 5/2004 | Pasadyn |
| 6,807,531 | B1 | 10/2004 | Kanai |
| 6,970,844 | B1 | 11/2005 | Bierenbaum |
| 7,103,562 | B2 | 9/2006 | Kosiba et al. |
| 7,139,686 | B1 * | 11/2006 | Critz et al. .................... 703/2 |
| 7,219,069 | B2 * | 5/2007 | Fouquet ......................... 705/8 |
| 7,533,008 | B2 * | 5/2009 | Mangino et al. .............. 703/6 |
| 2002/0035593 | A1 * | 3/2002 | Salim et al. ................ 709/202 |
| 2002/0049659 | A1 | 4/2002 | Johnson et al. |
| 2002/0052766 | A1 | 5/2002 | Dingman et al. |
| 2002/0091666 | A1 * | 7/2002 | Rice et al. ..................... 707/1 |
| 2002/0099571 | A1 | 7/2002 | Waku et al. |
| 2002/0127525 | A1 * | 9/2002 | Arington et al. ............ 434/262 |
| 2002/0169658 | A1 | 11/2002 | Adler |
| 2003/0050794 | A1 | 3/2003 | Keck |
| 2003/0216939 | A1 | 11/2003 | Bito et al. |
| 2004/0034857 | A1 | 2/2004 | Mangino et al. |
| 2004/0193451 | A1 | 9/2004 | McNair |
| 2004/0204914 | A1 | 10/2004 | Milland |
| 2004/0230404 | A1 | 11/2004 | Messmer et al. |
| 2007/0288212 | A1 | 12/2007 | Messmer et al. |

FOREIGN PATENT DOCUMENTS

| | | |
|---|---|---|
| JP | 05189495 | 7/1993 |
| JP | 07253963 | 10/1995 |
| JP | 2002056080 | 2/2002 |
| JP | 2003058680 | 2/2003 |
| JP | 2005165513 | 6/2005 |
| JP | 2005216024 | 8/2005 |
| JP | 2005293046 | 10/2005 |
| WO | 9725682 A1 | 7/1997 |
| WO | 0101206 A2 | 1/2001 |
| WO | 0213102 A1 | 2/2002 |
| WO | 0219221 A1 | 3/2002 |
| WO | 0227578 A1 | 4/2002 |
| WO | 02082348 A2 | 10/2002 |
| WO | 03025703 A3 | 3/2003 |
| WO | 2004042563 A2 | 5/2004 |
| WO | 2005033832 A3 | 4/2005 |

OTHER PUBLICATIONS

Gladwin et al., "Introduction to ProcessModel and Process Model 9C00", Proceedings of the 1997 Winter Simulation Conference, Dec. 1997, pp. 594-600.

ProModel, "ProModel User's Guide version 4.2", ProModel Corporation, (approximately 1998) (at URL: http://mx.geocities.com/io2_jonathan/MANUALELECTRONICOPROMODEL.htm).

Anonymous, "How Stuff Works—What are relational databases?", retrieved on Jul. 16, 2008 from computer.howstuffworks.com.

Promodel Simulator 2007 User Guide 5.1. (202 pages), ProModel Corporation, printed Apr. 17, 2008.

Kai Merlins, Markus Rabe, Frank-Walter Jaekel: "Neutral Template Libraries for Efficient Distributed Simulation within a Manufacturing System Engineering Platform"; Proceedings of the 2000 Winter Simulation Conference; pp. 1549-1557, 2000.

U.S. Appl. No. 09/481,252 including art cited therein (related application cited in present application).

Son et al., "Automatic Generation of Simulation Models from Neutral Libraries: An Example," Proceedings of the 2000 Winter Simulation Conference, vol. 2, pp. 1558-1567, Orlando, FL, Dec. 2000.

Delen et al., "Integrated Modeling and Analysis Generator Environment (IMAGE): A Decision Support Tool," Proceedings of the 1998 Winter Simulation Conference, vol. 2, pp. 1401-1408, Dec. 1998.

Hlupic et al., "Business Process Modeling and Analysis Using Discrete-Event Simulation," Proceedings of the 1998 Winter Simulation Conference, vol. 2, pp. 1363-1369, Dec. 1998.

Stritzinger ("A Component-Based Modeling Approach," Proceedings of the WOON '96, St. Petersburg, Russia, Jun. 20-21, 1996.

Benson, "Stimulation Modeling and Optimization Using ProModel" Proceedings of the 1997 Winter Simulation Conference, p. 587-593, Orem, UT.

Non-Final Office Action for U.S. Appl. No. 10/222,894, filed Aug. 19, 2002, mailed Jul. 31, 2006.

Non-Final Office Action for U.S. Appl. No. 10/723,110, filed Nov. 25, 2003, mailed Jan. 17, 2007.

Final Office Action for U.S. Appl. No. 10/723,110, filed Nov. 25, 2003, mailed Jun. 25, 2007.

* cited by examiner

Fig. 8

Business System Analysis

- Model Server 210
- Web Server 230
- Database 220

Business Modeling system has:
- Process steps / locations
- Work objects - entities
- Roles & groups
- Assignments
- Workflow routes & process times
- Demand profiles

Features:
- Build & Maintain process capability and analysis knowledge repository.
- Analyze & Control Capability.... What-if's scenarios, Strategy Comparisons
- Business Analytics, Forecasting, Planning
- Maintain digital system links for accurate historical demand patterns and processing times.

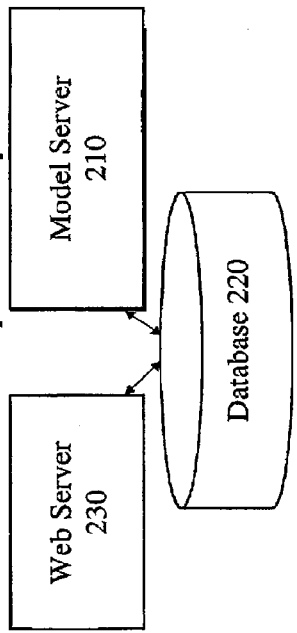

Digitized system is interrogated

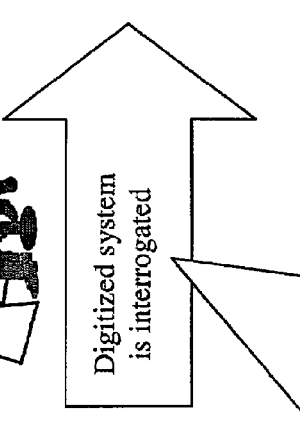

340

Automatically Extract System data to Integrate digitized business system with analysis & decision support technology

- Automating system model build and updating (automated distribution curve fitting)
- Can be integrated with business & economic forecasting system

Workflow System

- Workflow Engine 252
- Workflow DB 250

Workflow system contains:
- Schema - process steps states
- Types - work objects
- Roles & groups
- Assignments
- Event logs
  - Process times
  - Demand patterns

Source can be combination of different business systems:
- Financial
- CRM
- Sales
- Accounts Receivable
- ERP

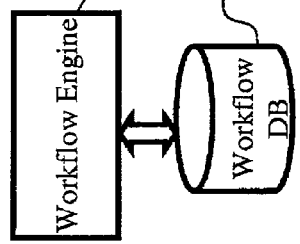

FIG. 16

How does this tool, help?     See a Demo

Click here to find out     View a real case scenario using CT/MR Optimizer

The Generic Business System Process Modeling System allows process owners and quality leaders the ability to test their business system's performance under a variety of conditions. This WEB based dynamic modeling technology will allow businesses to construct and save a variety of business system workflow alternatives and test system performance under a broad range of conditions.

Below are listed the models and templates currently defined in the system.

Select either an existing model (to modify) or a template (new model creation) and a version number to proceed to the next step.

COMING SOON - Models may be created and updated from digital workflow system such as TIBCO and eMatrix. This will allow more accurate process time and arrival rate distributions to easily and automatically be incorporated into your business critical process simulations Preliminary version ─────────── Click to generate model from workflow data

| Model List | Version | | | Template List | Version | | |
|---|---|---|---|---|---|---|---|
| Mays New Model with right sequence ▲ | 1 | Select | Delete | CT_Template | | View | Create New Model |
| Mei2 | 2 | | | | | | |
| Z-EC_ScanIndexFieldsPR | | | | | | | |
| test EURO claims build ▼ | | | | | | | |

Model Descriptor

Testing workflow model create

Process steps 310, 332, 342

FIG. 17

Auto Generate a process model based on historical workflow data
Generated list of workflow Select a workflow:

CA_CashAlloc_Workflow
EB_DealApproval
EC_ScanIndexFields
EC_ScanIndexFieldsPR
ERC_ADMIN_TEST_EDM_START1
TAC_ACCOUNTING_PD
TAC_BORDEREAUX_PD
TAC_FACBOOKING_PD
TAC_XLBOOKING_PD
UKCLAIMS_SETUP Specify a unique name for the new model.

Z-EC_ScanIndexFieldsPR

Give a description of the new model:

Testing workflow model create

Select the time period of the workflow you are interested in(format=MM-DD-YYYY):

From: 01-01-2001   To: 04-01-2001

☐ Show detailed output

[Create Model]  [Close]

Process step 320

FIG. 19

Model elements can easily be added and edited

| Model Id | Model Name | Version |
|---|---|---|
| 211 | Z-EC_ScanIndexFieldsPR | 1 |

Model information page; Only name, version number and description can be updated using this page. This page should be accessible from any point in the modeling process. This page should appear when a model is loaded from the database. You can select models from the database.

| | |
|---|---|
| Model name: | Z-EC_ScanIndexFields | Version number: | 1 |
| Number of entities | 8 | Number of arrivals | 0 |
| Number of resources | 0 | Number of resource groups | 0 |
| Number of process steps | 10 | Number of assignments. | 0 |
| Number of workflows | 32 | Last modified Scheduled Arrivals | |

You can edit the model description or create another model using this model as a starting point or template by changing the name or version number and pressing the update button. This will create a new instance of the model that you can make changes to while saving the current model for future reference.

Model description: | Testing workflow model create |

[ Update ] [ Done ]

Process Step 336

Fig. 20

Edit entities (add, delete and change names)

| Model Id | Model Name | Version |
|---|---|---|
| 211 | Z-EC_ScanIndexFieldsPR | 1 |

Build list of system entities :

Add new entities to the list or change the name of an entity in the list.

Add New | ChangeName

Entity03
Entity04
Entity05
Entity06
Rejected_ByReview | Delete

Model Info

Apply | Done

Process step 336

FIG. 21

Edit resources (add, delete, schedule and change names) — Process step 336

| Model Id | Model Name | Version |
|---|---|---|
| 211 | Z-EC_ScanIndexFieldsPR | 1 |

Build a list of system resources: Add new resources to the list or change a resource in the list.

Set resource Schedule CAN THIS BE DONE WITH A GRAPHIC CONTROL?

Name: [DataEntry_1]

Cost per Hr: [0]

[Add New] [Update]

[DataEntry_1]

[Delete]

Scheduled Days:
☑ Monday ☑ Tuesday ☑ Wednesday ☑ Thursday ☑ Friday
☐ Saturday ☐ Sunday Scheduled Hours:
From: [8 ▷] [00 ▷] [AM ▷] To: [5 ▷] [00 ▷] [PM ▷]

[_____]  [FirstShift]

[Apply] [Delete]  [Add New Schedule]

NOTE: Schedules should be defined for both resources and operations or tasks on this page. Schedules can be selected and assigned to process steps on the process step page. Define schedules to reflect the actual availability of the resources and links Model Info

[Apply] [Done]

FIG. 22

Group resources for task assignments

| Model Id | Model Name | Version |
|---|---|---|
| 203 | Claims | 1 |

Place resources into groups based on the tasks that they will perform.

Group Name: Adjudicate

Data Entry 1
Data Entry 2
ADJ 1
ADJ 2
ADJ 3

Add Group

Update Group

Data Entry
Adjudicate

Delete

Apply | Done

Process step 336

Model info

FIG. 24

Process steps (add, delete and modify)

Process step 336

Build a list of system process steps: Add new process steps to the list or change a process in the list.

| Model Id | Model Name | Version |
|----------|------------|---------|
| 211 | Z-EC_ScanIndexFieldsPR | 1 |

Name: Scan Index Fields    capacity: 1    cost per
use 0

[Add Before]  [Add After]  [Change Selected]

TA_Indexing
Scan Index Fields
ClmReviewClaim
ClmMgrReview Claim

[Delete]

Set Process

Downtime: Set Downtime

First Time: 0

Duration: 0

Time Between: 0

[Apply] [Done]

Model info

FIG. 25

Change arrival patterns (Number & frequency)

Process Step 336

| Model Id | Model Name | Version |
|---|---|---|
| 203 | Claims | 2 |

Arrivals describe the entry pattern of entities into the business process from an external source.

| Entity | Arrives at Process Step | Qty. Each | First Time | Occurances | Frequency |
|---|---|---|---|---|---|
| SL Claim ▽ | Arrival_Q ▽ | | | | |

[Add Arrival] [Update] [Del Arrival]

```
SL Claim At Arrival_Q 15  0 INF 168 HR
SL Claim At Arrival_Q 15 24 INF 168 HR
SL Claim At Arrival_Q 15 48 INF 168 HR
SL Claim At Arrival_Q 15 72 INF 168 HR
SL Claim At Arrival_Q 15 96 INF 168 HR
```

[Apply] [Done]

Model info

FIG. 26

Change process flow and processing times with the workflow screen

| Model Id | Model Name | Version |
|---|---|---|
| 211 | Z-EC_ScanIndexFieldsPR | 1 |

Build Workflow for Entity: Large_Value ▷

Select a process step:

TA_Indexing
Scan Index Fields
ClmReviewClaim
ClmMgrReview Claim
RegMgrReview Claim
ClmLeaderReview
Book Claim
TA_Approval
Close Sleep
UWComments

Enter the processing Time:

L(4.31,1.4)
Update

Workflow generated time distributions:

Add Before | Add After

TA_Indexing E(602.47)
Scan Index Fields W(1.7,48.9)
ClmReviewClaim L(3.64, 1.0)
ClmMgrReview Claim L (4.31.1, 1.4)
RegMgrReview Claim L(3.84,0.18)

Delete

Set Time

Copy

Entity03

Copy and used Workflow

Apply | Done

Process step 336

Model Info

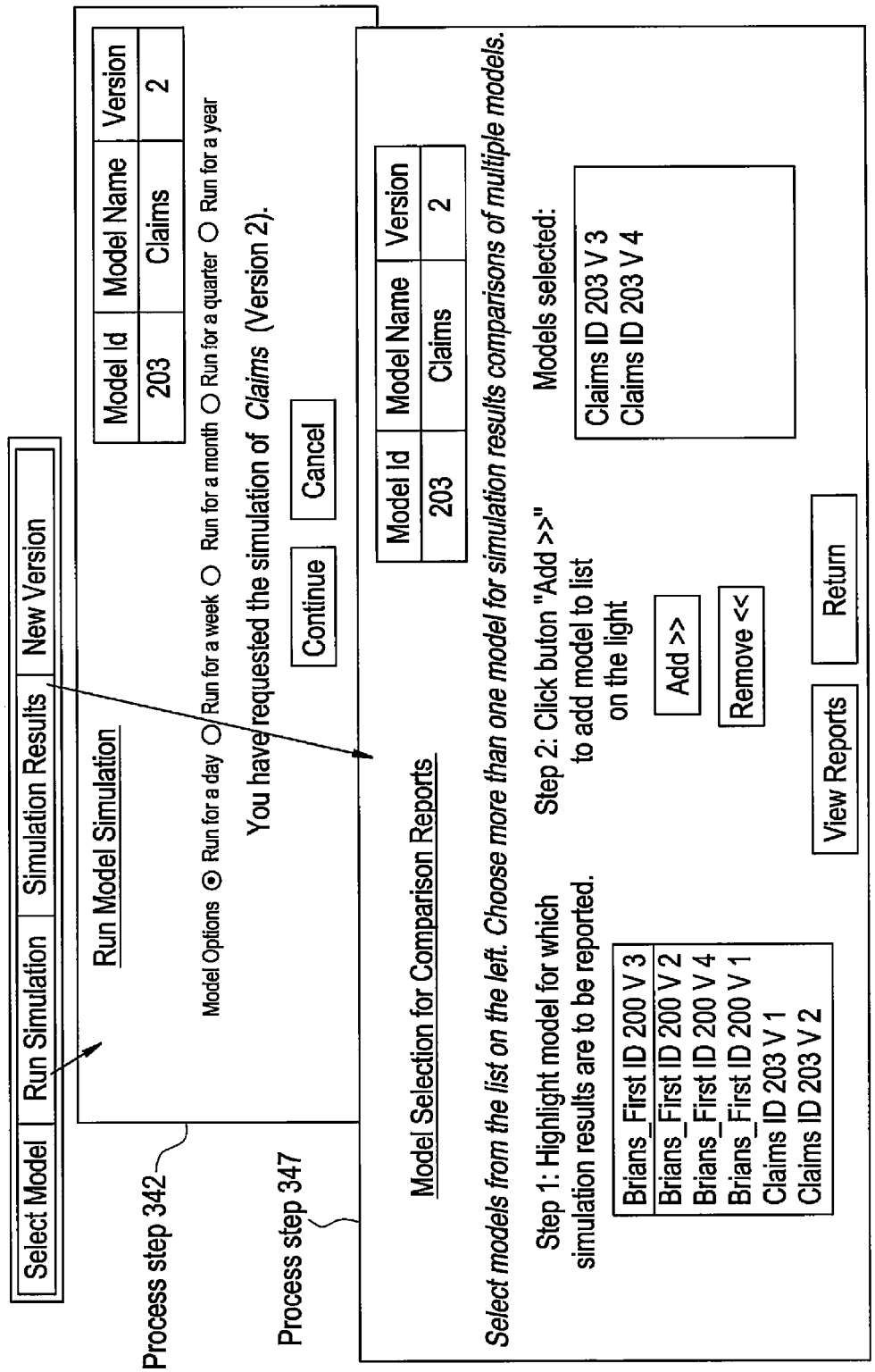

Viewing results

Process step 347

SYSTEM AND METHOD FOR SIMULATING A DISCRETE EVENT PROCESS USING BUSINESS SYSTEM DATA

CROSS-REFERENCE TO RELATED APPLICATIONS

This application is a continuation of U.S. patent application Ser. No. 10/222,894, entitled "SYSTEM AND METHOD FOR SIMULATING A DISCRETE EVENT PROCESS USING BUSINESS SYSTEM DATA," filed Aug. 19, 2002, which issued on May 12, 2009 as U.S. Pat. No. 7,533,008. The foregoing application is herein incorporated by reference in its entirety.

BACKGROUND OF THE INVENTION

The present invention relates generally to a computer system for modeling and simulating complex business processes having multiple discrete tasks, each of which may be performed by one or more available resource. More particularly, the invention relates to a computer system which includes a modeling interface to a generic simulation engine that allows a user easily to define and modify models representative of the discrete tasks and the available resources and attributes associated with the tasks and resources, such as task sequence and dependence, task times by entity type, resource skill level, and resource schedule, etc., for example.

The following paragraphs in this section are intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Complex business processes, such as sales processing and patient scheduling and processing, generally involve many discrete tasks which can be performed by many different resources having different availability. Not only can the discrete tasks be performed by different resources, but the tasks may also be performed according to various different task flows and dependencies. However, the multitude of different tasks, variability in processing times, task arrangements, and available resources introduce numerous variables, variable dependencies, and combinations of variables, making it difficult to design an optimal process or system for a given anticipated demand level and pattern.

The planning and design of such complex processes and systems have typically been approached in two ways. Under the first approach, the process or system is simply designed and implemented. The system or process is then actually performed in an experimental environment to verify its operation and efficiency. This approach, however, is costly because of the consumption of valuable resources (e.g., skilled workers, materials, capital, etc.) required to purchase, install, and verify the process or system, as well as the resources required to correct inadvertent errors in the design and planning that may have occurred and were not discovered until after implementation.

Under the second approach, simulation software is used to model the process or system and then to simulate operation of the process or system. This approach is advantageous as it provides the opportunity to test and verify the design before investing in the actual implementation. Further, once developed, the model can be used to play out "what-if" scenarios to evaluate alternative implementations, thus facilitating optimization of the final design.

Although the simulation approach seemingly offers a practical and efficient solution to designing complex processes and systems, existing simulation software traditionally is expensive and difficult to use. Development of simulation models must be performed by software programmers having expertise in the simulation language and simulation programming techniques. Such programmers are expensive and often do not have special knowledge regarding the particular process or system that the programmer is modeling. Further, once developed, the underlying model can be changed only by interacting with the simulation software code, thus requiring the continued participation of the programming or simulation expert.

Accordingly, existing simulation systems are not particularly flexible and moreover, such existing systems are difficult to use without the continued assistance of a programming expert. Still further, the costs associated with the acquisition and use of a simulation system often are prohibitive.

Accordingly, it would be desirable to provide a simulation system that could be easily used by non-software experts, particularly by users having special knowledge with respect to the process or system being simulated. Also, it would be desirable to provide a simulation system in which simulation models can be easily created, modified, and stored so that iterative or alternative design processes may be carried out and the same simulation system could be used to simulate numerous different types of processes. Further, it would be advantageous if such a system could be designed with a modeling interface that could be used by many users concurrently, thus reducing costs associated with modeling and simulating processes. In addition, the system could be designed such that the simulation could be performed over a network (e.g., an intranet, the Internet, etc.) thus allowing the user, such as a design consultant, to work from a remote location (e.g., a customer's facility).

The invention addresses the above problems with known techniques, as well as others.

BRIEF SUMMARY OF THE INVENTION

Certain aspects commensurate in scope with various embodiments of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect, the invention provides a system to simulate a process of discrete tasks having a plurality of available resources associated therewith, the system comprising a model database to store a plurality of models, each model including a plurality of task and resource parameters; a model portion in communication with the model database and configured to receive commands from a user, to retrieve one of the plurality of models and corresponding task and resource parameters in response to a user command, to receive input data corresponding to attributes of one or more task and resource parameters from a business database system, and to generate a simulation model based on the selected business database system and the input data; and a model server to perform a simulation of the process by processing the simulation model and to generate an output data file containing output data representative of the simulation.

In accordance with a further aspect, the invention provides a method to simulate a process of discrete tasks having a plurality of available resources associated therewith, the method comprising storing a plurality of models in a model database, each model including a plurality of task and resource parameters; communicating with a model portion by a user, the model portion in communication with the model database and configured to receive commands from the user, to retrieve one of the plurality of models and corresponding task and resource parameters in response to a user command, to receive input data corresponding to attributes of one or more task and resource parameters from a business database system, and to generate a simulation model based on the selected business database system and the input data; performing a simulation of the process by processing the simulation model; and generating an output data file containing output data representative of the simulation.

In accordance with a further aspect, the invention provides a computer readable medium to simulate a process of discrete tasks having a plurality of available resources associated therewith, the computer readable medium comprising a first portion that stores a plurality of models in a model database, each model including a plurality of task and resource parameters;

a second portion that communicates with a user, the second portion in communication with the first portion and configured to receive commands from the user, to retrieve one of the plurality of models and corresponding task and resource parameters in response to a user command, to receive input data corresponding to attributes of one or more task and resource parameters from a business database system, and to generate a simulation model based on the selected business database system and the input data; a third portion that performs a simulation of the process by processing the simulation model, and that generates an output data file containing output data representative of the simulation.

In accordance with a further aspect, the invention provides a system to simulate a process of discrete tasks having a plurality of available resources associated therewith, the system comprising a model database to store a plurality of models, each model including a plurality of task and resource parameters; a web server in communication with the model database and configured to receive commands from a user, to retrieve one of the plurality of models and corresponding task and resource parameters in response to a user command, to receive input data corresponding to attributes of one or more task and resource parameters from a business database system over the Internet, and to generate a simulation model based on the selected business database system and the input data; and a model server to perform a simulation of the process by processing the simulation model and to generate an output data file containing output data representative of the simulation; and wherein the model portion also receives the input data corresponding to attributes of one or more task and resource parameters by interacting with the user over the Internet; and wherein commands from a user are received through a graphical user interface, the graphical user interface located remote from the database; and wherein the model database records and maintains links between corresponding information in the model database and the business database system.

In accordance with a further aspect, the invention provides a method to simulate a process of discrete tasks having a plurality of available resources associated therewith, the method comprising storing a plurality of models in a model database, each model including a plurality of task and resource parameters; communicating with a web server by a user, the web server in communication with the model database and configured to receive commands from the user, to retrieve one of the plurality of models and corresponding task and resource parameters in response to a user command, to receive input data corresponding to attributes of one or more task and resource parameters from a business database system, and to generate a simulation model based on the selected business database system and the input data; performing a simulation of the process by processing the simulation model; and generating an output data file containing output data representative of the simulation, and wherein the processing includes performing distribution curve fitting on the input data using a goodness of fit technique, wherein the processing performed by the system includes using process times information from the business database system, the process times information containing information relating to various jobs and tasks within respective jobs, the processing generating results using the distribution curve fitting and by determining entity types; and wherein the model portion concurrently presents different model information to a user for comparison.

BRIEF DESCRIPTION OF THE DRAWINGS

The present invention can be more fully understood by reading the following detailed description together with the accompanying drawing, in which like reference indicators are used to designate like elements, and in which:

FIG. 8 is a block diagram showing further aspects of a process in accordance with one embodiment of the invention;

FIG. 16 is a user interface showing aspects of a user requesting a model in accordance with one embodiment of the invention;

FIG. 17 is a user interface showing a generated list of workflow in accordance with one embodiment of the invention;

FIG. 19 is a user interface showing aspects of adding model elements in accordance with one embodiment of the invention;

FIG. 20 is a user interface showing aspects of editing entities in accordance with one embodiment of the invention;

FIG. 21 is a user interface showing aspects of editing resources in accordance with one embodiment of the invention;

FIG. 22 is a user interface showing aspects of group resources for task assignments in accordance with one embodiment of the invention;

FIG. 24 is a user interface showing aspects of changing process steps in accordance with one embodiment of the invention;

FIG. 25 is a user interface showing aspects of changing arrival patterns in accordance with one embodiment of the invention;

FIG. 26 is a user interface showing aspects of changing process flow and processing times in accordance with one embodiment of the invention;

FIG. 27 is a diagram showing user interfaces illustrating aspects of running a simulation and viewing the results in accordance with one embodiment of the invention;

DETAILED DESCRIPTION OF THE INVENTION

Various embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The foregoing description of various products, methods, or apparatus and their attendant disadvantages described in the in the "Background of the Invention" is in no way intended to limit the scope of the invention, or to imply that the invention does not include some or all of the various elements of known products, methods, and/or apparatus in one form or another. Indeed, various embodiments of the invention may be capable of overcoming some of the disadvantages noted in the "Background of the Invention," while still retaining some or all of various elements of known products, methods, and apparatus in one form or another.

As used herein, any term in the singular may be interpreted to be in the plural, and alternatively, any term in the plural may be interpreted to be in the singular.

This invention addresses the problems discussed above, as well as others. The invention provides an easy to use and accurate model building system. The invention seamlessly utilizes information from operational business systems to automatically build base line simulation models. Mappings are maintained between the operational systems and the modeling system to allow future updates of the model. Simulation models may be created by users unfamiliar with programming techniques. With the invention, users can create new versions of models and test a variety of alternative system configurations.

Figure 1:
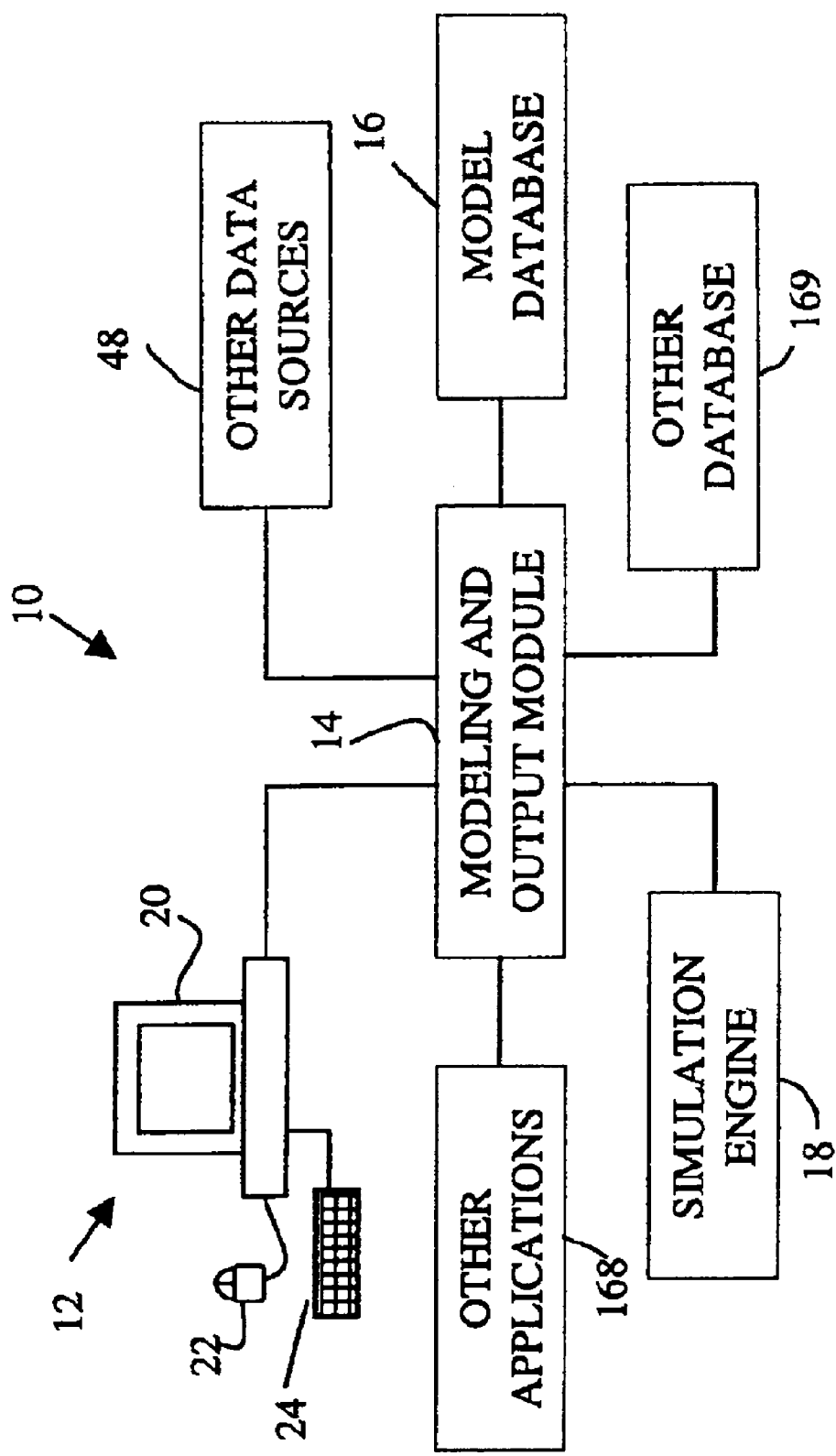
FIG. 1 is a block diagram representation of the computer simulation system in accordance with one embodiment of the invention.

Turning now to the drawings, and referring first to FIG. 1, one embodiment of a simulation system 10 is illustrated. The simulation system 10 allows a user to define a model of a system or process that includes a plurality of discrete tasks, which can be performed using a variety of different available resources. Templates of models and defined models can be stored in a database for later retrieval and use or modification. The user can define simulation models by providing commands to create new model templates and to search for and select existing model templates and parameters associated with the templates and by inputting data corresponding to attributes of the selected parameters. Further, data can be provided from other sources, such as a maintenance system which monitors the operation and performance of one or more pieces of equipment, to refine or embellish the model created by the user.

The system 10 also allows a user to view output generated as a result of running a simulation using the defined model. The output can be any of a variety of types of outputs, such as a graph or table displayed on a graphical user interface, a report printed using an output device, or a data file transmitted via a network to remote locations for viewing or storage. Provision of a feature that allows customization of outputs allows data to be provided and formatted in a manner that is most beneficial to the particular user for viewing and analyzing the results of the simulation. Further, the output feature provides a mechanism that allows the user to direct the simulation output data to another type of software application (e.g., a financial analysis program) for performing other types of analyses (e.g., performance of a cost/benefit analysis)

based on the simulation. The other software application can then provide output data that can be formatted as specified by the user.

Various elements advantageously used for accomplishing the features discussed above include a graphical user interface (GUI) 12, a modeling and output module 14, a model database 16, and a simulation engine 18. The GUI 12 includes a display 20 (e.g., a CRT or LCD monitor display), and various input devices, such as a mouse 22 and an alphanumeric keyboard 24. The GUI 12 provides for user interaction with system 10 via a variety of graphically displayed screens including images, such as icons, windows, menus and dialog boxes, which appear on display 20. A user of the system 10 can provide commands and input data to the system 10 by using input devices 22 and 24 to select, manipulate, input text and otherwise interact with the displayed graphical images.

As illustrated in FIG. 1, the system 10 includes a model database 16 for storing a plurality of model templates and defined simulation models. The database 16 advantageously is a relational database. Model templates are database structures which are predefined and stored in the database 16 as a plurality of related tables representative of a plurality of resource and task parameters associated with the model template. A user defines a model based on a template by selecting parameters and inputting data corresponding to the attributes of each parameter. The input data is stored in data records associated with the tables.

Figure 4:
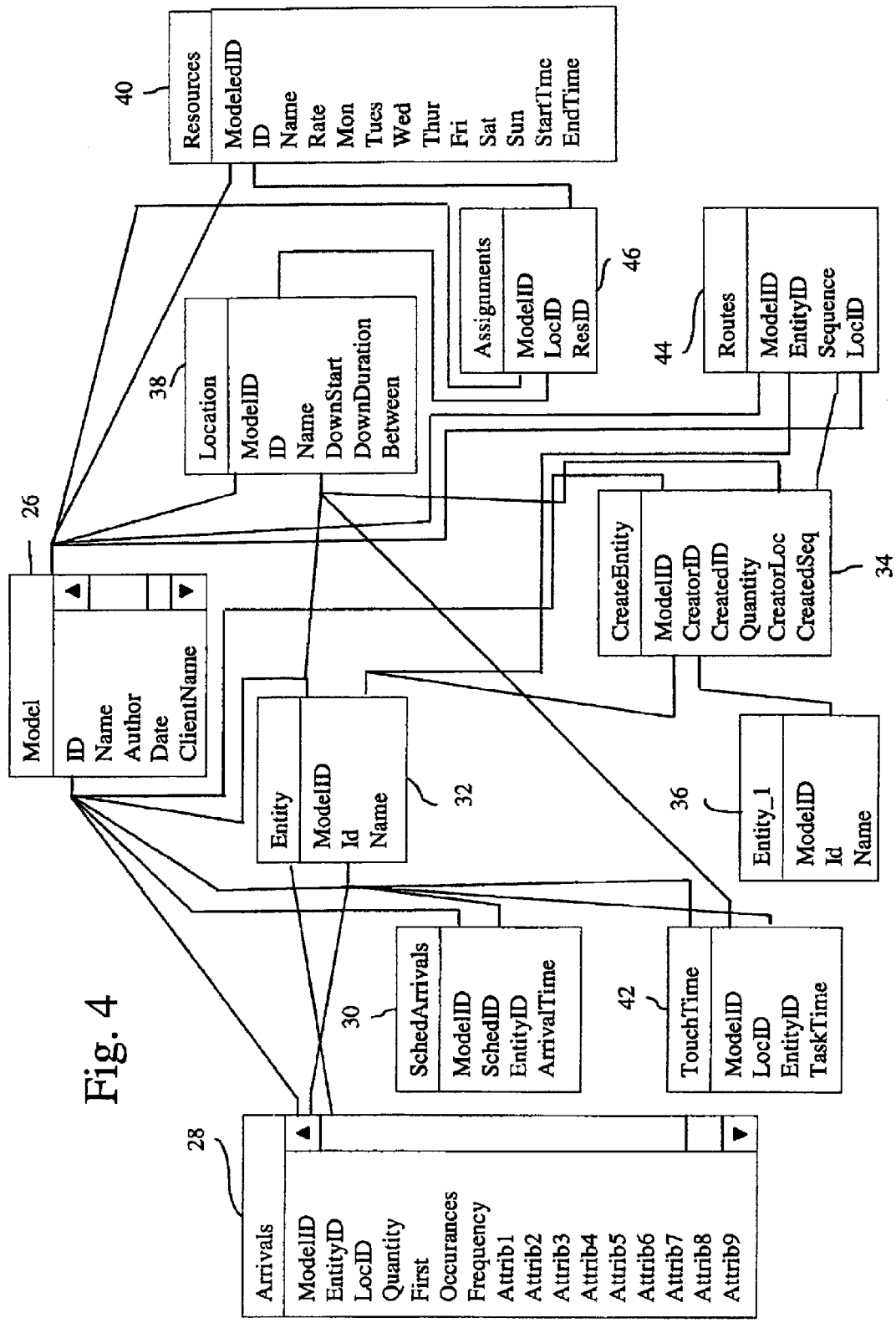
FIG. 4 is a pictorial representation of the structure and organization of the model database of FIG. 1, illustrating the relationship between a plurality of tables containing entries which correspond to the task and resource parameters of a model template in accordance with one embodiment of the invention.

The relationship between parameter tables associated with a particular model template stored in the database 16 is illustrated in FIG. 4. The particular model template illustrated is useful for defining a simulation model for an endless variety of business processes. The model template for this particular application is indexed by a plurality of attributes, including a unique identifier (ID), a descriptive name (Name) (e.g., a capacity model, a scheduling model, an inventory model, a through-put model), the author of the template (Author), the date the template was created (Date), and the client or process owner for whom the template was created (ClientName). These attributes are included in a Model table 26 for that particular model template. The model template also includes a plurality of task and resource parameters associated with the template which define the tasks to be performed, the available resources for performing the tasks, and the flow or sequence in which the tasks are to be performed. Each of these parameters is represented by a parameter table 28-46 which includes the various attributes corresponding to the parameter. Each parameter table 28-46 also includes an attribute that provides a link to Model table 26. In the exemplary embodiment illustrated in FIG. 4, the linking attribute is the unique identifier associated with the model template, i.e., ModelID. which corresponds to the ID attribute in table 26.

As shown in FIG. 4, the parameters associated with the model template for a scheduling process, such as the medical imaging application, include arrivals (Arrivals table 28), scheduled arrivals (SchedArrivals table 30), task entities (Entity table 32, CreateEntity table 34, and Entity_I table 36), task locations (Location table 38, available resources (Resource table 40), time associated with performing a task (Touchtime table 42), task sequences and routes (Routes table 44), and assignments of resources to tasks (Assignments table 46). Each table includes the attributes associated with the represented template parameter. For example, the Resource table 40 includes the attributes ModelID, ID (of the resource), Name (of the resource), Rate (resource cost), Mon-Sun (available days), and StartTime and EndTime (available hours). Data corresponding to all or some of the attributes may be input by the user of the system 10 via the GUI 12, may be retrieved from other data sources 48 (e.g., a software application), may result from processing routines executed by the modeling module 14, or any combination of the foregoing. For example, the value for the ResID attribute of the Assignments table 46 is derived by the modeling module from data input by the user which corresponds to the ID attribute of the Resource table 40. Similarly, the value of the ModelID attribute in each of the parameter tables is derived by the modeling module from user data corresponding to the ID attribute of the Model table 26. The relationships between attributes in different tables are illustrated by the lines in FIG. 4 which are illustrated as interconnecting the related attributes in the tables. Regardless of the source, the input data is stored in data records in the database 16 which are associated with tables 26-46.

Figure 3:
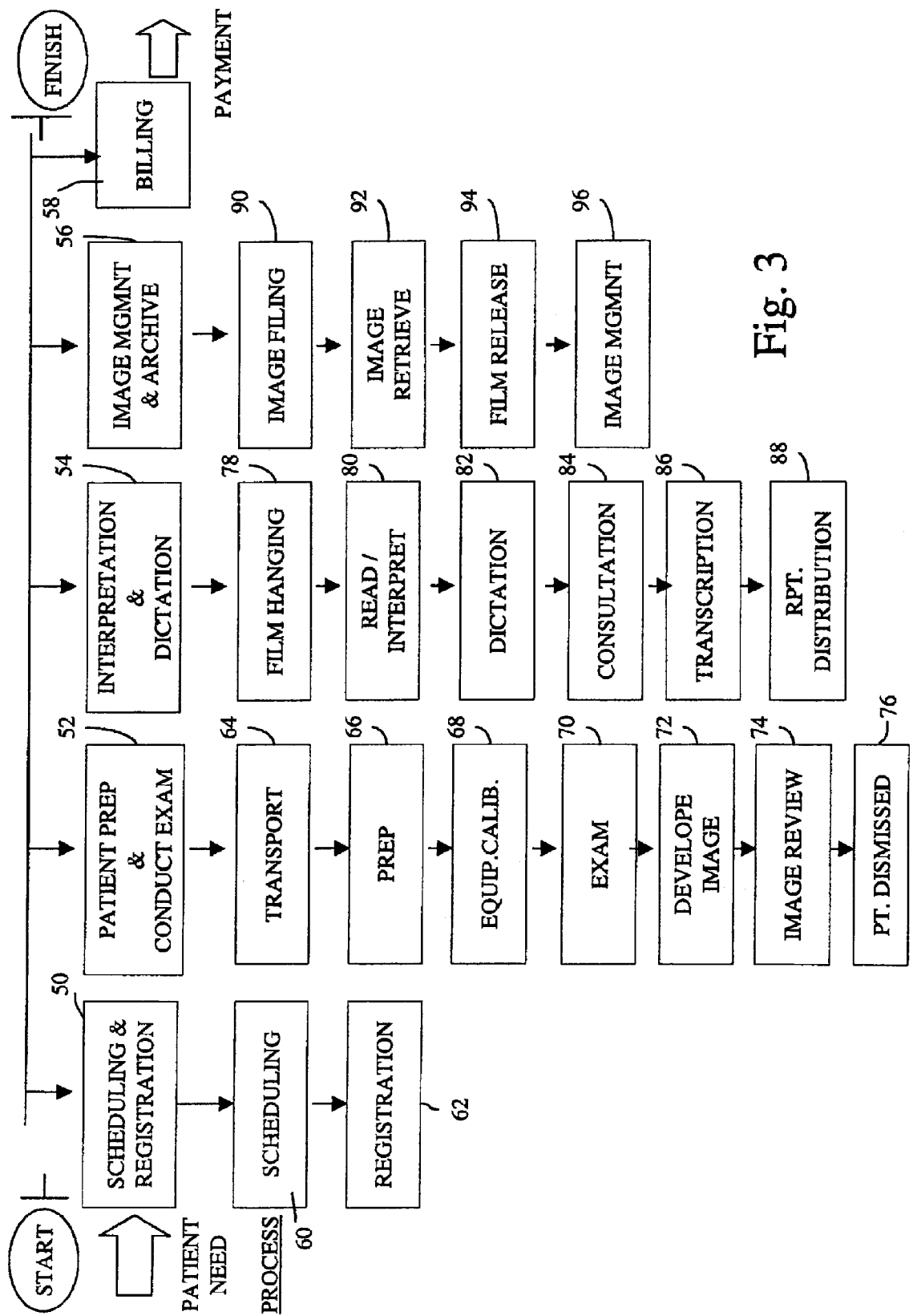
FIG. 3 is a block diagram illustrating the breakdown and flow of a plurality of discrete tasks in a process for scheduling, conducting, reviewing and concluding a medical imaging examination of a patient, the process being an exemplary discrete task process that can be modeled and simulated using the computer simulation system of FIG. 1 in accordance with one embodiment of the invention.

FIG. 3 illustrates a process flow of discrete tasks for an exemplary medical imaging scheduling and processing application which can be modeled using a discrete event modeling system. The process is broken down into basic task elements 50-58, each of which may include one or more sub-tasks. For example, the basic task elements and flow of the medical imaging process include schedule and registration of a patient (task 50), preparation and imaging of the patient (task 52), interpretation of the imaging results and dictation of a report (task 54), image management and archiving (task 56), and billing for the procedure (task 58). The scheduling and registration task 50 includes sub-tasks scheduling 60 and registration 62. The patient preparation and imaging task 52 includes transportation of the patient to an examination room (task 64), preparation of the patient for examination (task 66), calibration of the imaging equipment (task 68), examination of the patient (task 70), development of the images (task 72) review of the images to determine whether additional examination is necessary (task 74), and dismissal of the patient (task 76). The interpretation and dictation task 54 includes hanging the image films for viewing by a diagnosing physician (task 78), reading and interpreting the images (task 80), dictating the physician's report (task 82), consultation with other physicians (task 84), transcription of the dictated report (task 86), and distribution of the report (task 88). The image management and archiving task includes the sub-tasks of filing images in an image archive (task 90), retrieving images from archive (task 92), releasing the film (task 94), and managing the archive of images (task 96).

Figure 2:
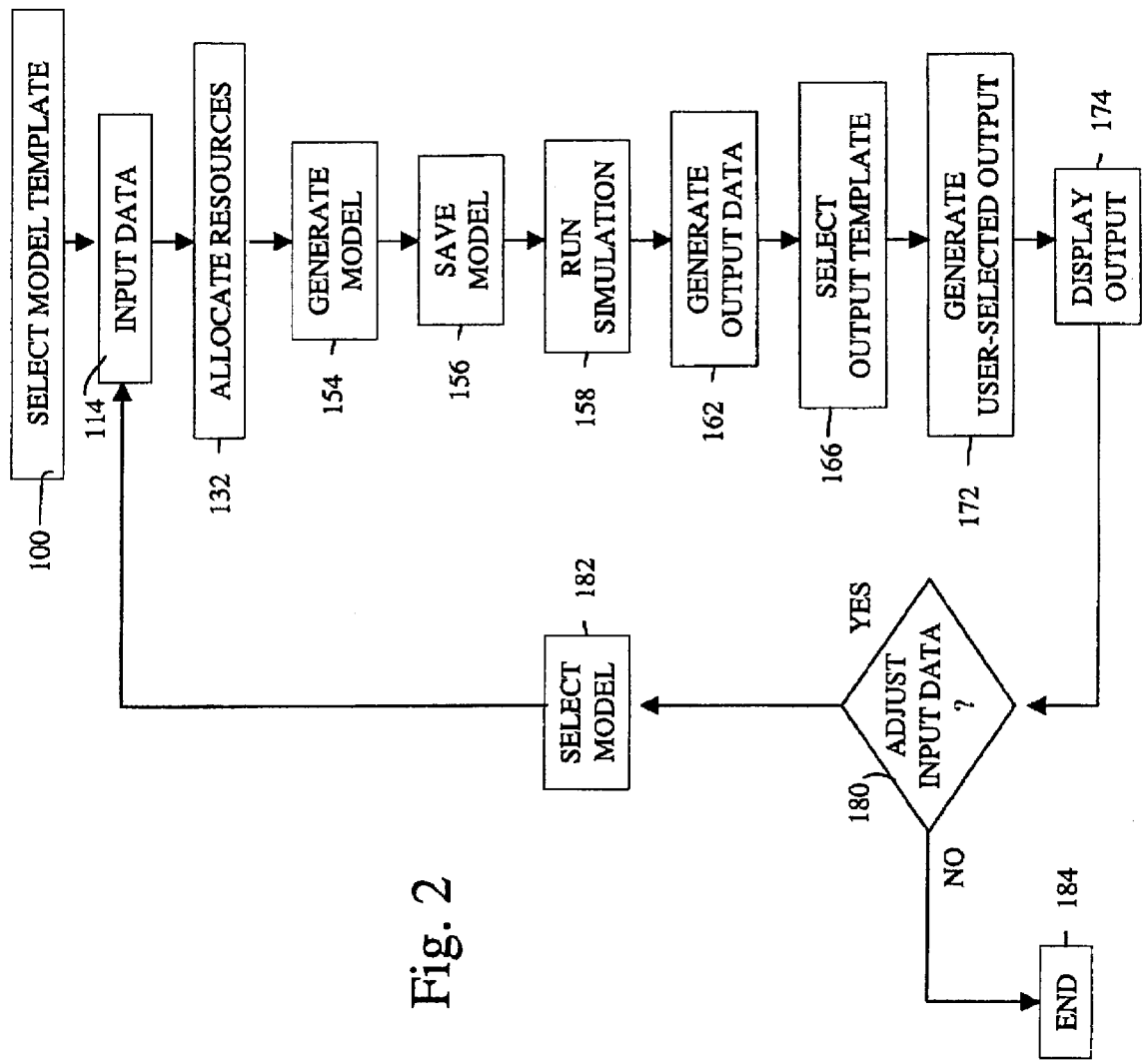
FIG. 2 is a flow chart representing the procedure for defining a simulation model, defining a output, and running a simulation based on the model using the system of FIG. 1 in accordance with one embodiment of the invention.

To create a simulation model of the medical imaging process following the flow illustrated in FIG. 3 and to run a simulation based on the model, the steps represented by the flow chart in FIG. 2 are performed. To create the model, the user selects a model template from the database (step 100). Selection of the template can be performed by initiating a search for a template appropriate for modeling a medical imaging process. For example, the user of the system 10 can query the database 16 for an appropriate model template by, for example, initiating a search based on an attribute of the template, such as the description or name of the template (e.g., a scheduling model), the client for whom the template was created, or the author of the template. The search may result in a list of several templates which satisfy the search criteria. The user can then select the desired template. Alternatively, rather than searching, the user can simply select the template from a displayed list of all available templates. In response to the query, the modeling module 14 retrieves the template and its associated tables and records from the database 16 and generates a graphical display on the GUI 12 with which the user can interact to define a simulation model based on the selected template.

After step 100, as shown in FIG. 2, the process passes to step 114, in accordance with one embodiment of the invention. In step 114, the data is input from a suitable source, such as for example, a business data base system. Then, the process passes to step 132. In step 132, resources are allocated. Then, in step 154, a model is generated. The model may be generated using any of the wide variety of features described herein. After step 154, the process passes to step 156. In step 156, the model is saved. Then, in step 158, a run simulation is performed. Then, in step 162, output data is generated. It should be appreciated that a user may view this output data in any of a wide variety of forms. Accordingly, in step 166, the user selects an output template. In response, in step 172, the process generates a user-selected output. Then, in step 174, the output is displayed.

In step 180, the user is then provided with an opportunity to adjust the input data. If the user does indeed wish to adjust the input data, then the user might again go through a selection model process as shown in step 182. After step 182, the process again returns to step 114, and proceeds as described both. Alternatively, the user may not wish to adjust input data. As a result, the process passes from step 180 to step 184, in which the process ends.

Figure 5:
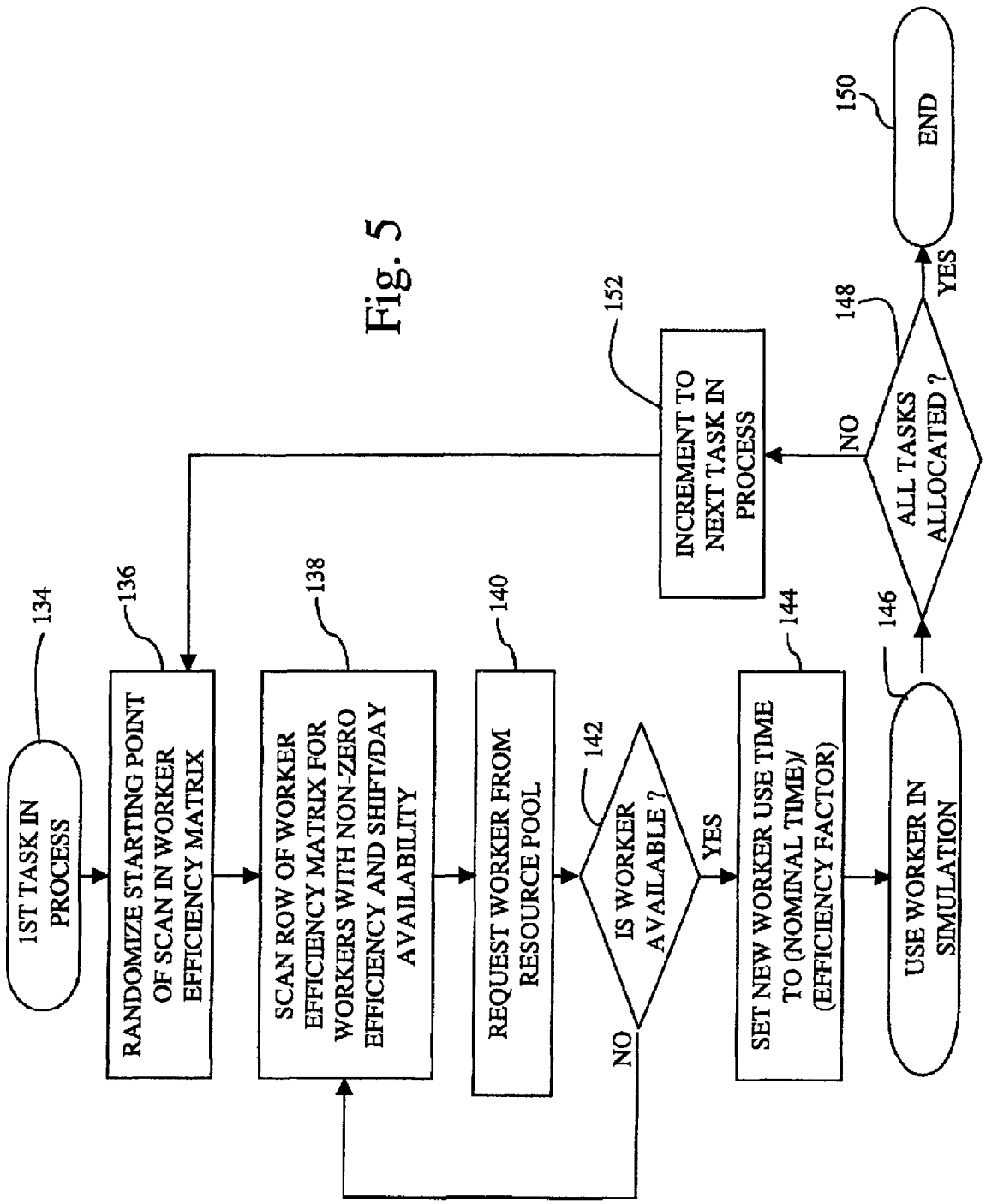
FIG. 5 is a flow chart representing an exemplary manner in which the modeling module allocates available resources to tasks based on the resource scheduling and an efficiency matrix in accordance with one embodiment of the invention.

FIG. 5 shows further details of FIG. 2, in accordance with one embodiment of the invention. To allocate the resources to tasks (step 132 in FIG. 2), the modeling module 14 advantageously includes a software algorithm that executes the steps shown in the flow chart of FIG. 5. In particular, the algorithm considers the first task in a sequence of tasks that comprise the process (step 134). The algorithm then randomly selects a starting point for scanning the entries in the resource efficiency matrix 130 (step 136). Beginning at the random starting point, each row is scanned for a resource having a non-zero efficiency factor and shift/day availability (step 138). When a suitable resource is found, the resource is requested from the pool of available resources (step 140), as shown in FIG. 5. The algorithm then verifies that the resource is available (e.g., has not been assigned to a conflicting task, has time available, etc.) (step 142). If the resource is not available, the algorithm returns to step 138 and scans the next row in the efficiency matrix. When an available resource is found, the resource is designated as allocated to the task for a use time that is determined by the ratio of the nominal time to perform the task to the resource's efficiency factor (step 144). Thus, for example, if the nominal time for performing the task is determined by the user to be ten minutes, and the resource's efficiency factor for that particular task is 0.5, then the resource's use time is twenty minutes. The allocation of the resource to the particular task is then used to create the simulation model (step 146).

As shown in FIG. 5, the algorithm then determines if all tasks of the process have been allocated (step 148). If so, the allocation is complete (step 150). If not, then the algorithm increments to the next task in the process (step 152) and begins scanning the matrix for an available resource to allocate to that task (step 136). The allocation routine continues until all tasks have been allocated. Data representing the resulting allocations are stored in data records in database 16 which are associated with the Assignments table 46 illustrated in FIG. 4. These allocations will be used in the simulation model.

It should be understood that the allocation algorithm illustrated in FIG. 5 is merely one exemplary embodiment. In other embodiments, the algorithm may determine the allocation in a different manner or may arrange the resource data other than in a matrix. For example, the algorithm may scan the rows in the resource efficiency matrix until a resource having an efficiency factor of "1" is found and shift/day availability. Alternatively, the steps of the algorithm set forth in FIG. 5 can be performed in a sequence other than the sequence illustrated. Further, although the flow chart in FIG. 7 refers to "workers," it should be understood that a resource can be any asset used to perform a task, such as equipment, transportation devices, etc., for example.

With further reference to FIG. 1, the system 10 has a structure that includes discrete modules. In particular, the system 10 includes the GUI 20 for inputting data, the modeling and output module 14 for defining and generating models and outputs, the model database 16 for storing the models and model templates, and the generic simulation application 18 for performing a simulation using the model. Each of these modules can be included in a stand alone computing system having memory for storing the modeling and output module 14, the simulation application 18 and the database 16, as well as a microprocessor for executing the code underlying the module 14 and application 18 and processing the data associated therewith. The other applications 168 and the other databases 169 can also be stored in the memory of the standalone computing system. Other data sources 48, such as a business database system, can be in communication with the standalone computing system via a network connection, a peripheral port for communicating with data devices, a modem and telephone line, etc.

The modular structure of the system 10 is particularly advantageous for allowing the user to access various components of the system 10 from a GUI 12 that is disposed at a location remote from the other components. For example, the user of the system 10 may be a consultant who offers process or system planning services to clients. The model database 16, the modeling and output module 14, and the simulation application 18 may be located on a server at the user's place of business, while the GUI 12 may be located at the client's place of business. The user can access the remote server via a network connection initiated using the GUI 12 and the appropriate network communication software and network communication hardware. Such a remote access system is illustrated in FIG. 6.

Figure 6:
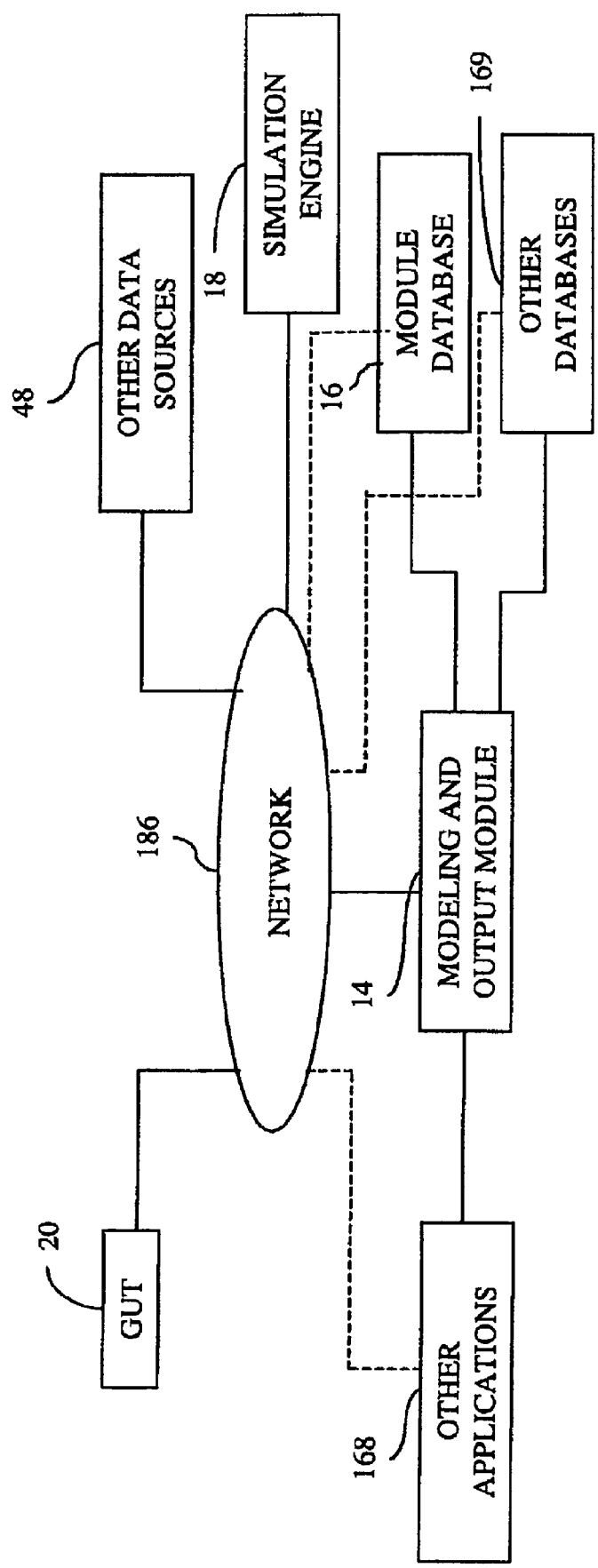
FIG. 6 is a block diagram of the computer simulation system of FIG. 1 implemented in a networked environment in accordance with one embodiment of the invention.

The Network 186 in FIG. 6 can be a proprietary network or a publicly accessible network, such as the Internet. In an Internet-based system, the simulation software and modeling database may be accessible at Web sites via a Web server and Web browser software. For example, the user may have a laptop computer which provides the GUI 12. The laptop computer can also include browser software (e.g., Microsoft Internet Explore r, Netscape Communicator®) stored in the computer's permanent memory. The user can access the other components of the system 10 via the GUI 12, the browser software, and appropriate communication hardware (e.g., a modem and telephone line) to establish a connection to a Web server. Alternatively, various components of the system 10, such as modeling and output module 14 can also be stored in the user's laptop computer, while only the simulation application 18 and the model database 16 are located remote from the user and the user's GUI. Still further, other components (e.g., other databases 69) can be located at other sites which are remote from both the GUI and the model database.

Accordingly, a simulation system and method has been described above in which simulation models may be created by users unfamiliar with programming techniques. The simulation models can be executed by any suitable, and advantageously, generic simulation software application that can read the data files representing the models. Further, the system provides a structure for allocating multiple available resources with different work schedules to the various discrete tasks of the modeled process. Moreover, the system is structured such that the user can create and run simulations from a remote location, such as a client's facility.

In accordance with one aspect of the invention described above, a user selects parameters and attributes and inputs data corresponding to the attributes as appropriate to describe thoroughly the tasks that must be performed, the sequence in which the tasks should be performed, the resources available for performing the tasks, and the occurrence of any other discrete events, such as scheduled arrivals, for example, that have an affect on the process. The data is stored in the database 16 in data records or files associated with the model. However, it should be appreciated that the invention is not limited to relying on such input by a user. Rather, the system of the invention may utilize any of a variety of business database systems so as to obtain information for the modeling process.

Hereinafter, aspects will be described in accordance with further embodiments of the invention. In addition to the various features described above, the invention provides the capability to integrate a generic business system dynamic modeling capability, such as is described above, with digitized business processes. As a result, the generic business modeling system provides an analysis and control capability that leverages existing information maintained by such digitized business systems. Such business systems might include Workflow, ERP, CMMS, Tracking systems or others, for example.

Accordingly, the description below provides an additional or alternative approach to input data used in the modeling process. However, it should be appreciated that the embodiments described below may be used in part or in whole with any of the above described embodiments and/or any of the embodiments or features described in U.S. patent application Ser. No. 09/481,252, which is related to the present application. U.S. patent application Ser. No. 09/481,252 filed Jan. 11, 2000, is incorporated herein by reference in its entirety.

For example, an illustrative system might obtain data from a business database system, according to the below disclosure, and report a modeling of that data using reporting techniques described above.

By accessing digitized business process data, the invention provides fast and efficient model development and "what if" analysis capability. The invention can be integrated with any of a variety of digitized system data repositories. Further, in accordance with some embodiments, the invention maintains information mappings to the information source system, automates process time and arrival rate distribution generation, and maintains a model repository for easy comparison of process alternatives. These and other features will be described below. Further, it should be again noted that the system and method of the invention are not restricted to users with model programming expertise. Rather, such expertise is not needed in order to perform the dynamic system "What If" analysis, in accordance with various embodiments of the invention.

In accordance with one embodiment of the invention, a web based generic business process modeling capability is integrated with digitized business systems via intelligent data interrogation methods. The process interrogation uncovers the actual business process behavior as exhibited by the digitized business system and constructs a simulation model of the process. The base system elements, which include for example tasks, resources, and entities, are identified as well as the relationships between these elements (resource groups, job assignments, and process sequences). The system then utilizes an automated curve-fitting component to generate entity type specific arrival rates and processing times based on the historical digital system data. Further, models can be subsequently updated with new arrival and processing times utilizing the curve-fitting capabilities. The model can then be altered to perform "what if" analysis on the business processes. As a result, a user can maintain a library of process configuration alternatives to test a wide range of business strategies.

Figure 7:
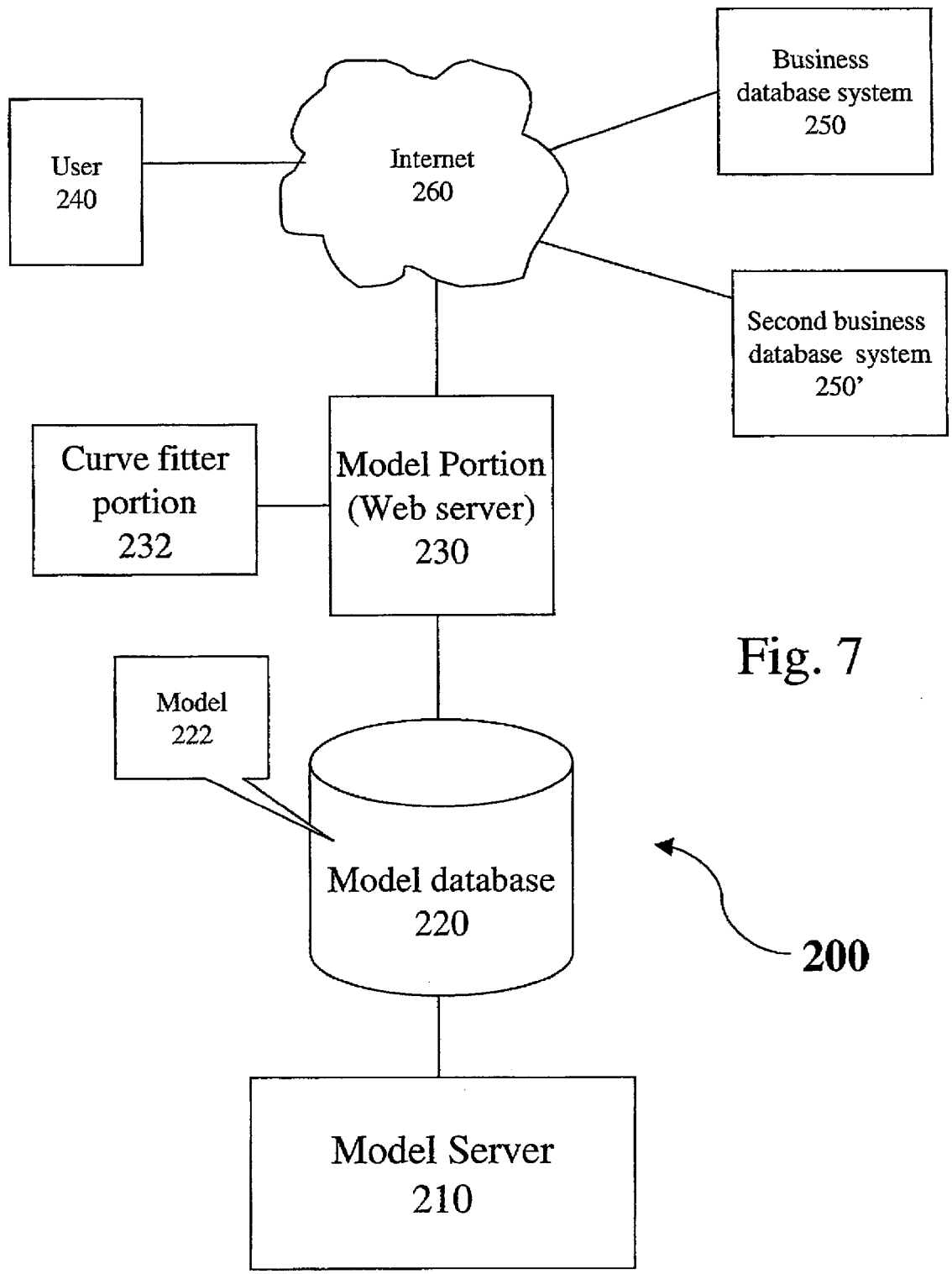
FIG. 7 is a block diagram showing a model system in accordance with a further embodiment of the invention.

FIG. 7 is a block diagram in accordance with one embodiment of the invention. As shown in FIG. 7, a model system 200 includes a model server 210, a model database 220 and a model portion 230. The model system 200 further includes a user 240. The model system 200 retrieves data from any number of business database systems, such as a business database system 250 and/or additional systems, such as the business database system 250', as is described in detail below. The data from the business database system 250 is used in the modeling process. The model portion 230, the user 240 and the business database system 250 may be in communication with each other via any suitable network, such as the Internet 260 shown in FIG. 7, or another network, as described above.

In accordance with one embodiment of the invention, the model portion 230 is in the form of a web server 230. However, the model portion may take on other forms as well. That is, for example, the model portion 230 might directly interface with a user and might be provided with business system data, i.e., in such a manner that communication over the Internet or another network is not needed.

In accordance with one embodiment of the invention, the model system 200 performs a system interrogation of the business database system 250. That is, the model system 200 extracts process history from the business database system 250 and builds a model based on that history. The building of the model may use a variety of parameters including resources that are available, tasks that are performed, workflow processing times, and/or a mixture of job start times and arrival rates, for example.

The model system 200 links the generated model to the workflow system from which data is retrieved, i.e., model system 200 links the generated model to the business database system 250, for example. Such links allow for future updating of the model once the parameters in the business database system 250 have changed. Further, the model system 200 auto generates model distributions, in accordance with one embodiment of the invention.

In accordance with one embodiment of the invention, the model portion 230 in the model system 200 provides a modeling interface. For example, this modeling interface might utilize JSP (JavaServer Page) technology. The model portion 230 interrogates the business database system 250 to retrieve data from the business database system 250. This data is then used in generation of a desired model of a business process. In accordance with one embodiment of the invention, the model portion 230 uses a curve fitter 232, as shown in FIG. 7. The curve fitter 232 assists the model portion 230 in understanding the data from the business database system 250. Operations of the model portion 230 and the curve fitter 232 are described in detail below.

As shown in FIG. 7, the model database 220 stores a variety of information used in the modeling process. For example, the model database 220 stores information obtained from the business database system 250, as well as data relating to a particular model.

The model system 200 also includes the model server 210. The model server 210 performs various operations in conjunction with the model portion 230. The model server 210 monitors the model database 220 for simulation requests, extracts model data from the model database 220 and creates model definition files. Further, the model server 210 runs "Generic Simulation Models" and places the results in the model database 220.

The web server 230 interrogates the business database system 250 for data used in generation of a model, i.e., at the request of a user. Once this data is input, the user can then adjust any of a wide variety of parameters using the techniques described herein. These adjustable parameters might be characterized as "system Xs". On the other hand, the system Xs are used by the model system 200 to generate "system Ys". The system Ys are generated parameters and are not generally adjustable by a user.

Illustratively, the system Xs might include resource levels, resource assignments, demand profiles, task times, process steps, or new workflows. The user may save different parameter sets by storing alternative models. This allows the user to compare the various system Xs and system Ys so as to understand system variability, and the manner in which the system varies based on different system Xs and the impact they have on the different system level Ys (Cycle time, throughput, inventory levels, for example).

FIG. 8 is a block diagram showing further aspects of a process in accordance with one embodiment of the invention. FIG. 8 shows the model server 210, the model database 220 and the model portion or web server 230, as described above. Further, FIG. 8 shows business database system 250 in the form of a workflow database. It should be appreciated that any of a variety of business database systems 250 may be utilized in the process of the invention, i.e., so long as the business database system 250 captures the various processing parameters, such as process time and resources used, of a particular business workflow system.

To explain further, the workflow system of FIG. 8 includes the business database system 250 and a workflow engine 252. The workflow system contains a particular schema, which keeps track of the state of various process steps used in the workflow process. The workflow system may contain and utilize various types of work objects, roles and groups, assignments, and event logs. For example, the event logs can include process times and demand patterns.

The business database system 250 can be one or a combination of a variety of systems. For example, the business database system 250 might use a financial system, a CRM system, a sales system, an accounts receivable and/or an ERP system. In accordance with one embodiment of the invention, the business database system 250 preferably utilizes a processing protocol by which a job, upon entry into the workflow engine 252, for example, is assigned a "job number." This "job number" identifies the job throughout its life in the workflow engine 252. Accordingly, all tasks that are performed for that job and all resources that were used to process that job, for example, are associated with the particular job number. This allows the business database system 250 to monitor discrete events in the life of that job. These discrete events are then obtained and used by the modeling in accordance with one embodiment of the invention.

Accordingly, in further explanation of one embodiment of the invention, the model system 200 automatically extracts system data, in the workflow or business database system 250 so as to integrate the digitized business system with the analysis and decision support technology provided by the invention. This process includes an automated system model build, as well as typically updating. Further, the model database 220 may process the data obtained from the business database system 250 using an automated distribution curve fitting process, described further below. Further, the results of the modeling may be integrated with business and/or economic forecasting systems.

With further reference to FIG. 8, the business system analysis, which is performed on data obtained from the business database system 250, uses a variety of parameters. For example, the business modeling system has process steps and/or locations; work objects—entities; roles and groups; assignments; workflow routes and process times; and/or demand profiles.

Further, the business modeling system 200 includes and uses a variety of features. These features include building and maintaining process capability and an analysis knowledge repository, as well as to provide analyze and control capability, i.e., which might include "what-ifs scenarios" and strategy comparisons, for example. The model system 200 may further incorporate business analytics, forecasting, and planning. Further, it should be appreciated that the model system 200 maintains digital system links to the business database system 250. These links provide for accurate historical demand patterns and processing times, over a period of time, such as weeks or years in the future.

Figure 9:
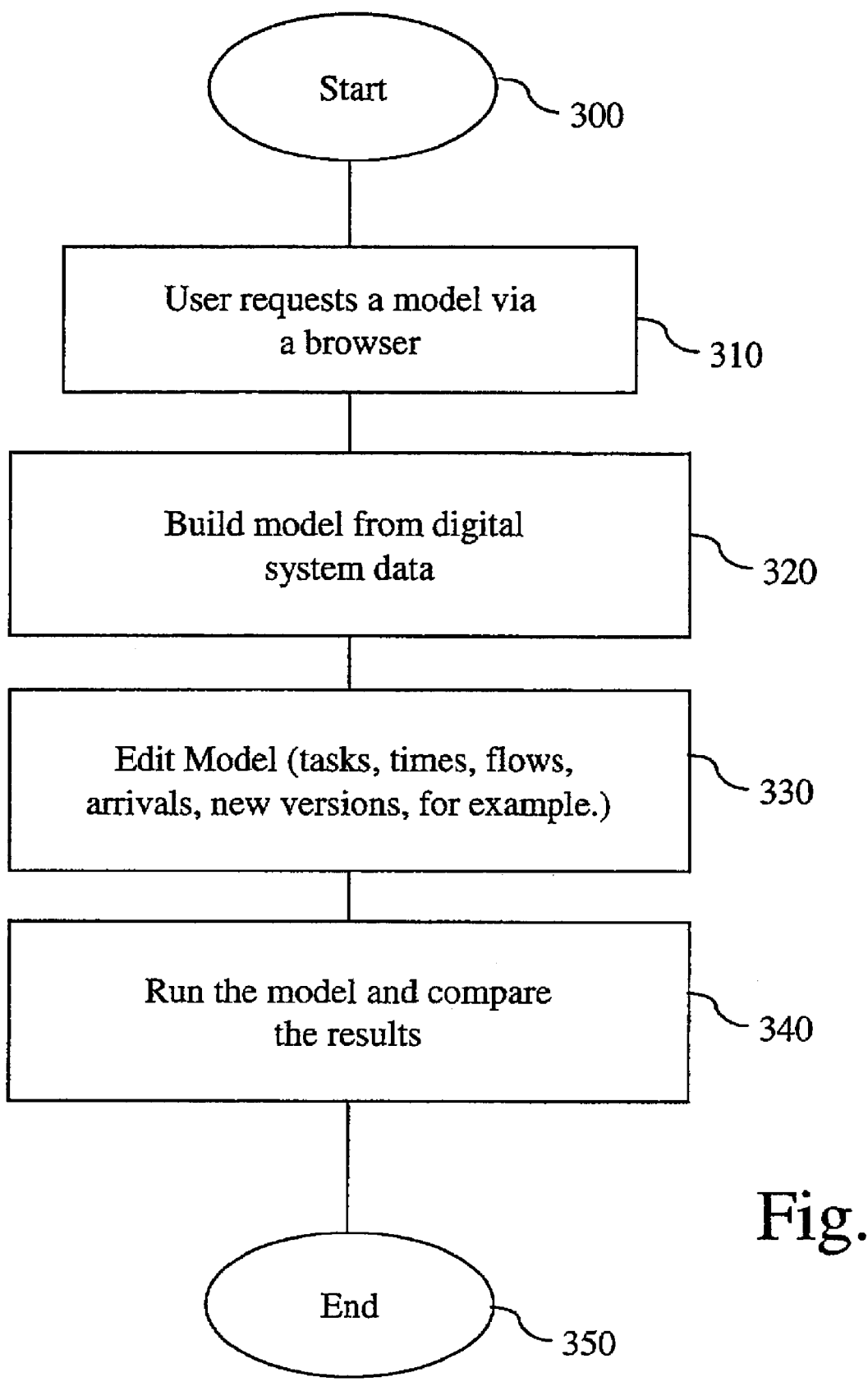
FIG. 9 is a high level flowchart of a modeling process in accordance with one embodiment of the invention.

FIG. 9 is a high level flowchart in accordance with one embodiment of the invention. The process of FIG. 9 may be performed by the model system 200 of FIG. 7, or by some other suitable modeling system in accordance with other embodiments of the invention. As shown in FIG. 9, the process starts in step 300. Then, the process passes to step 310. In step 310, a user requests a model via a browser by selecting a process or workflow template from database 220, such as by using the interface shown in FIG. 16, for example. Then, in step 320, the process builds a model based on the digital system data. Further details of step 320 will be described below.

After step 320, the process passes to step 330. In step 330, a user may edit the various parameters of the model. For example, the user might edit the tasks, times, flow of tasks, arrivals, and/or create new versions, for example. This editing may be performed using the techniques described above.

After the model is edited in step 330, the process passes to step 340. In step 340, the model is run and the results are reviewed and analyzed by the user. For example, the user might compare the output with another version of the model, which used different parameters. After step 340, the process ends in step 350. This high level flow would be repeated as the user performs analysis of the system output and makes adjustments to the model parameters to improve the modeled system's performance.

Figure 10:
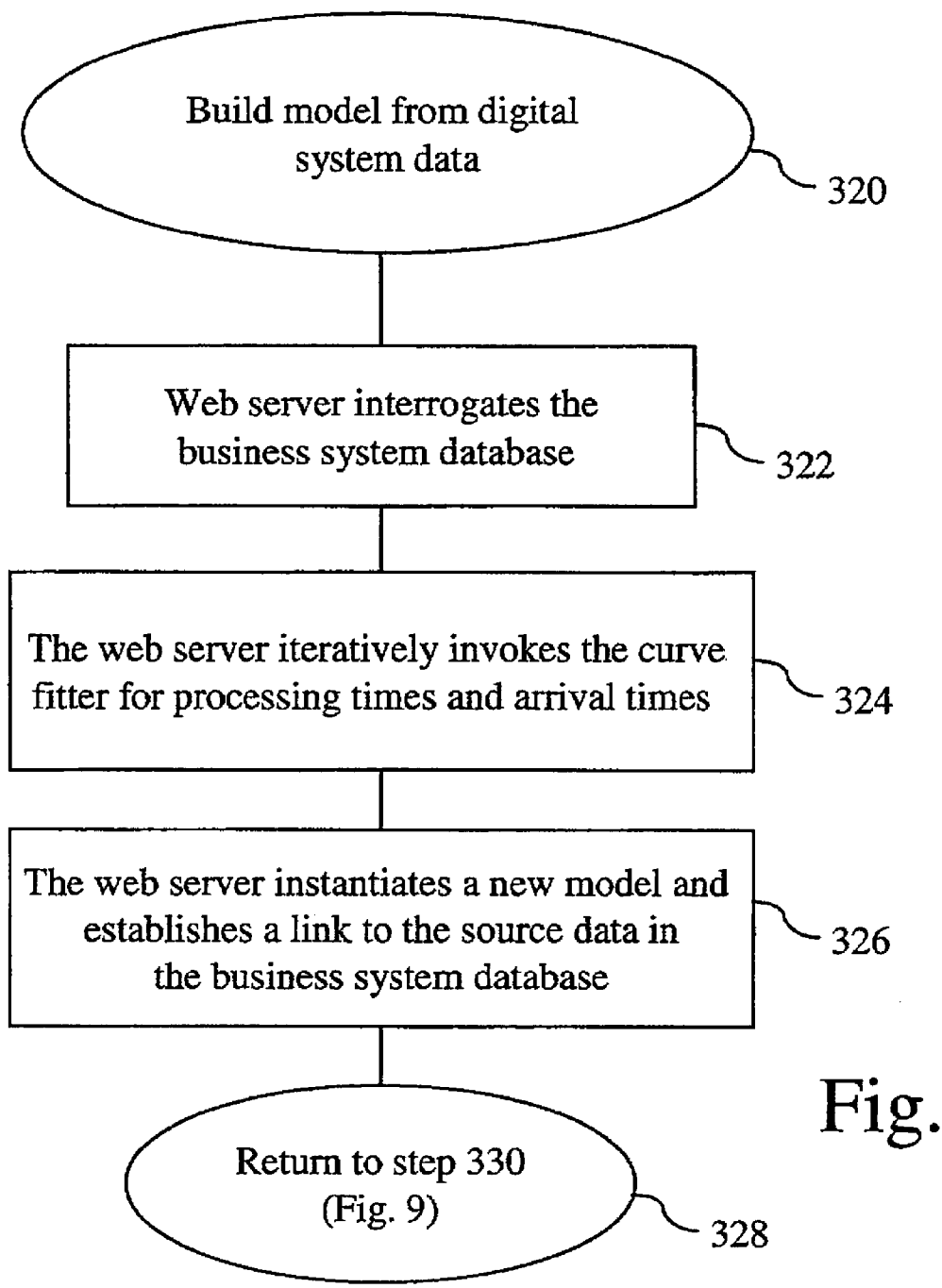
FIG. 10 is a flowchart showing in further detail the "build model from digital system data" step of FIG. 9 in accordance with one embodiment of the invention.

FIG. 10 is a flowchart showing in further detail the "build model from digital system data" step 320 of FIG. 9. The process of step 320 may utilize a user interface screen such as shown in FIG. 17. That is, a user may select a workflow, as desired. As shown in FIG. 10, the process starts in step 320 and passes to step 322. In step 322, the process interrogates the business system database extracting a series of completed job histories. Jobs may be grouped based on the sequence of tasks used to complete the processing of the job. Further aspects of this grouping are described below with reference to FIG. 15. Then, the process passes to step 324. In step 324, the process, i.e., as performed by the web server 230 for example, iteratively invokes a curve fitter for processing the data obtained from the business database. For example, the curve fitter may be used to analyze processing times and arrival times.

Distributions are generated for each entity type (i.e., which have a distinct sequencing of tasks that work is completed in) to represent the processing time required at each task. Distributions will also be generated for each entity type to represent the arrival pattern for that particular type of work into the business system. These distributions are placed into the newly generated model as well as being placed in a distribution history table so that changes in task times and arrival patterns can be monitored over time as the model is updated with new distribution utilizing the most recent history from the digitized business systems. Other data elements may be present in the business system data such as job attributes (value, size, customer identification, for example) that can also help segment or distinguish between types of work being processed. Each business system may require slight changes in the interrogation queries and algorithms and may provide different levels of completeness with respect to auto generation of the simulation model requirements for a particular business system. However, it should be appreciated that generally the underlying generic simulation data structure and generic model engine will require no changes to effectively model the business system.

As shown in FIG. 10, in accordance with one embodiment of the invention, after step 324, the process passes to step 326. In step 326, the web server instantiates a new model (including entities, resources, roles, task assignments by role, task times and arrival rates) and establishes a link to the source data in the business system database. Then, the process passes to step 328. In step 328, the process returns to step 330 of FIG. 9.

Figure 11:
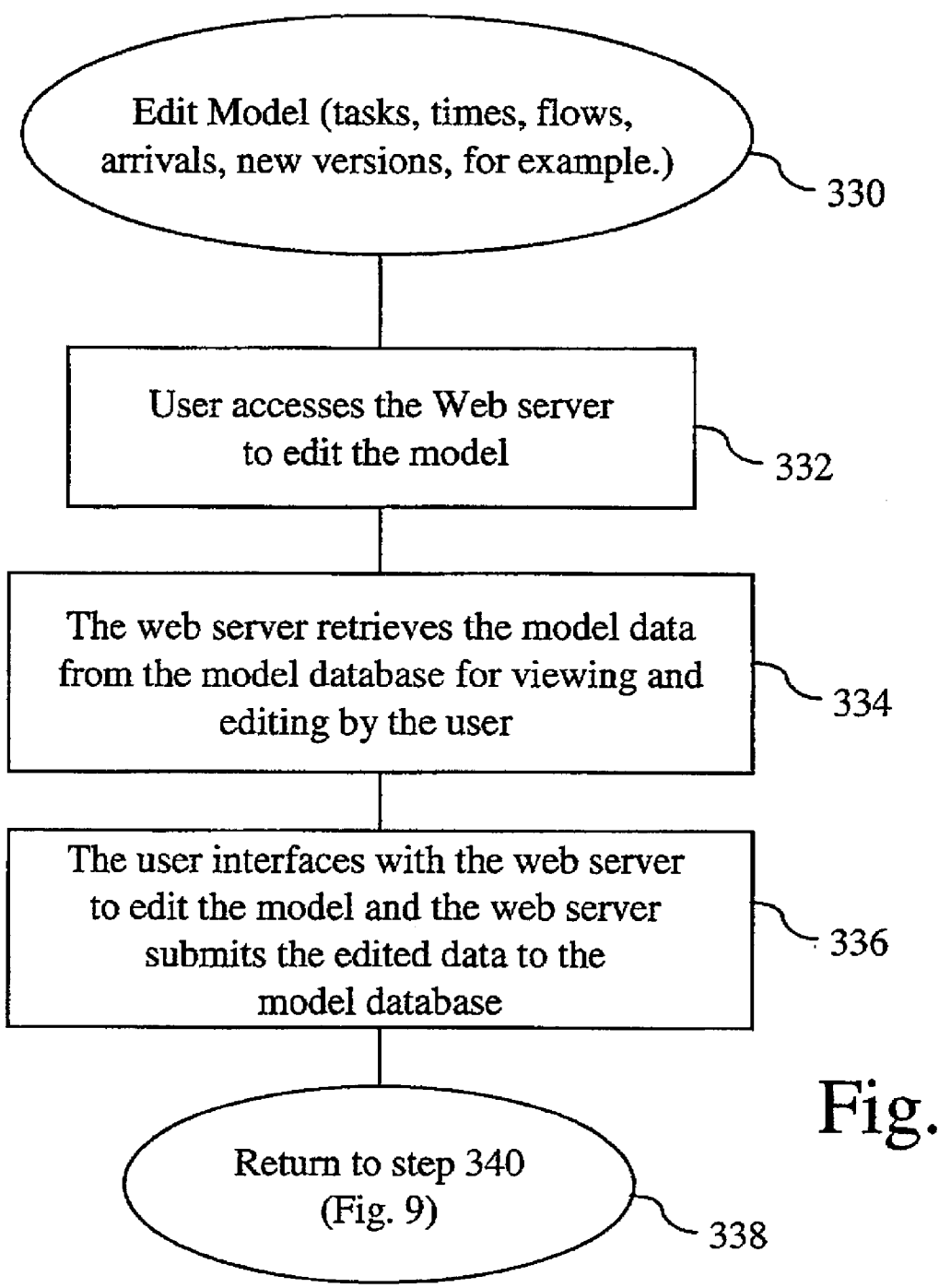
FIG. 11 is a flowchart showing in further detail the "edit model" step of FIG. 9 in accordance with one embodiment of the invention.

FIG. 11 is a flowchart showing in further detail the "edit model" step 330 of FIG. 9. As shown in FIG. 11, the process starts in step 330 and passes to step 332. In step 332, the user accesses the Web server to edit a model, as desired. The user may select the model to edit using a model name and version number, as shown in the user interface of FIG. 16, for example.

Figure 18:
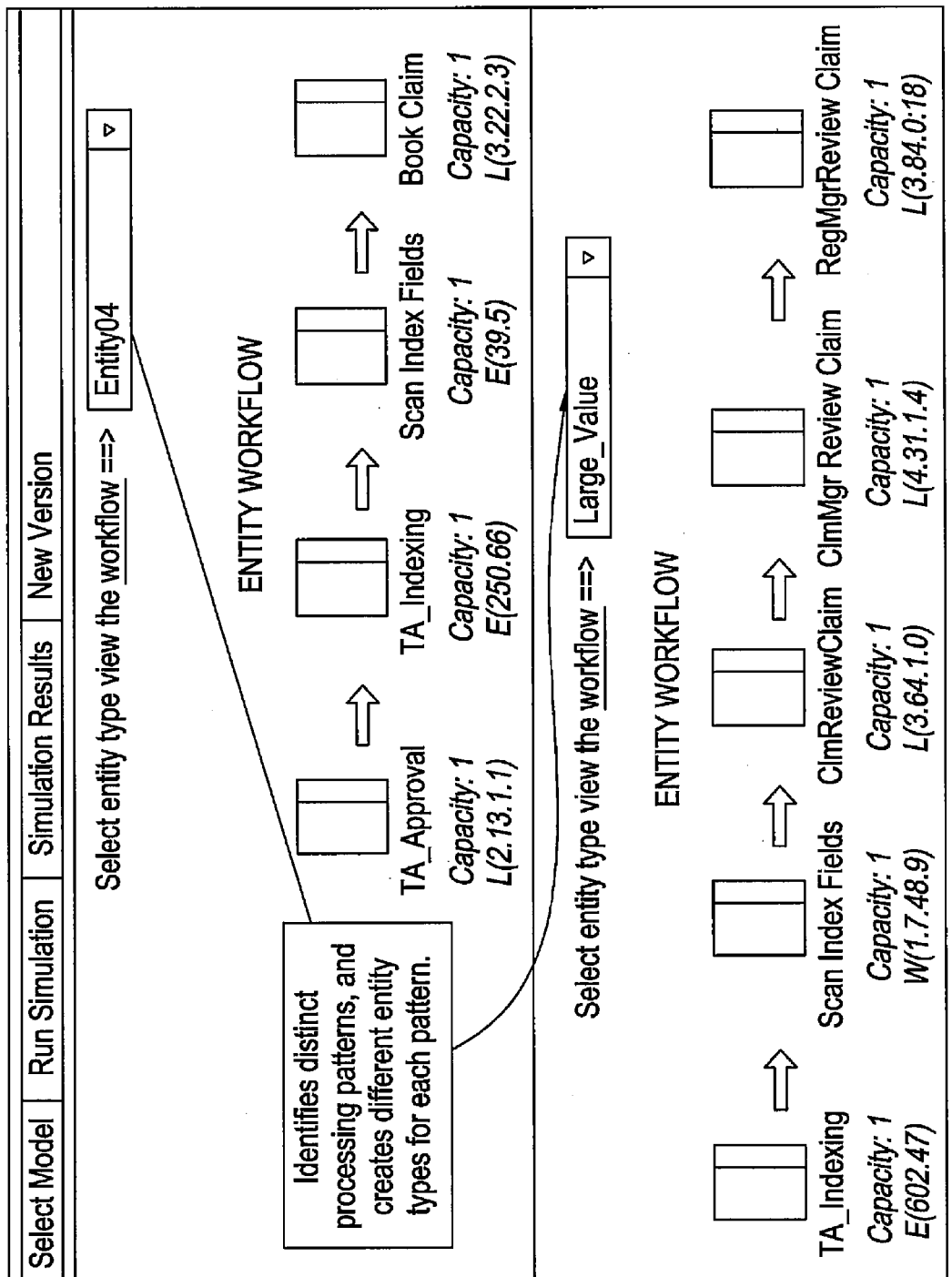
FIG. 18 is a diagram showing further aspects of identifying distinct processing patterns and creating different entity types for each pattern in accordance with one embodiment of the invention.

In response, in step 334, the web server retrieves the model data from the model database. The model data is then made available for viewing and editing by the user. FIG. 18 is a diagram illustrating aspects of process steps 330 and 334. That is, FIG. 18 shows that a user may select a particular entity and view the workflow associated with that entity type. As shown in FIG. 18, different entity types are created for each pattern, as described further below.

After step 334, the process passes to step 336. In step 336, the user interfaces with the web server to edit the model. This is done via a model information screen that provides links to the various model elements or parameters that can be added, edited or deleted. Such an illustrative user interface is shown in FIG. 19, for example. When the user makes changes to the model, the web server submits the edited data to the model database for storage, i.e., for later use. It should be appreciated that any of a wide variety of parameters may be edited including tasks, times, flows, arrivals, and/or new versions, for example.

After step 336, the process passes to step 338. In step 338, the process returns to step 340 of FIG. 9.

As described above, in step 336, the user interfaces with the web server to edit the model. This interfacing may be done using a variety of interface screens. Illustrative screens are shown in FIGS. 20-26. FIG. 20 is a user interface showing aspects of editing a list of system entities, in accordance with one embodiment of the invention. FIG. 21 is a user interface showing aspects of editing resources. Further, FIG. 22 is a user interface showing aspects of placing resources into groups based on the tasks they will perform. As shown in FIG. 22, groups may be added or updated, as desired.

Figure 23:
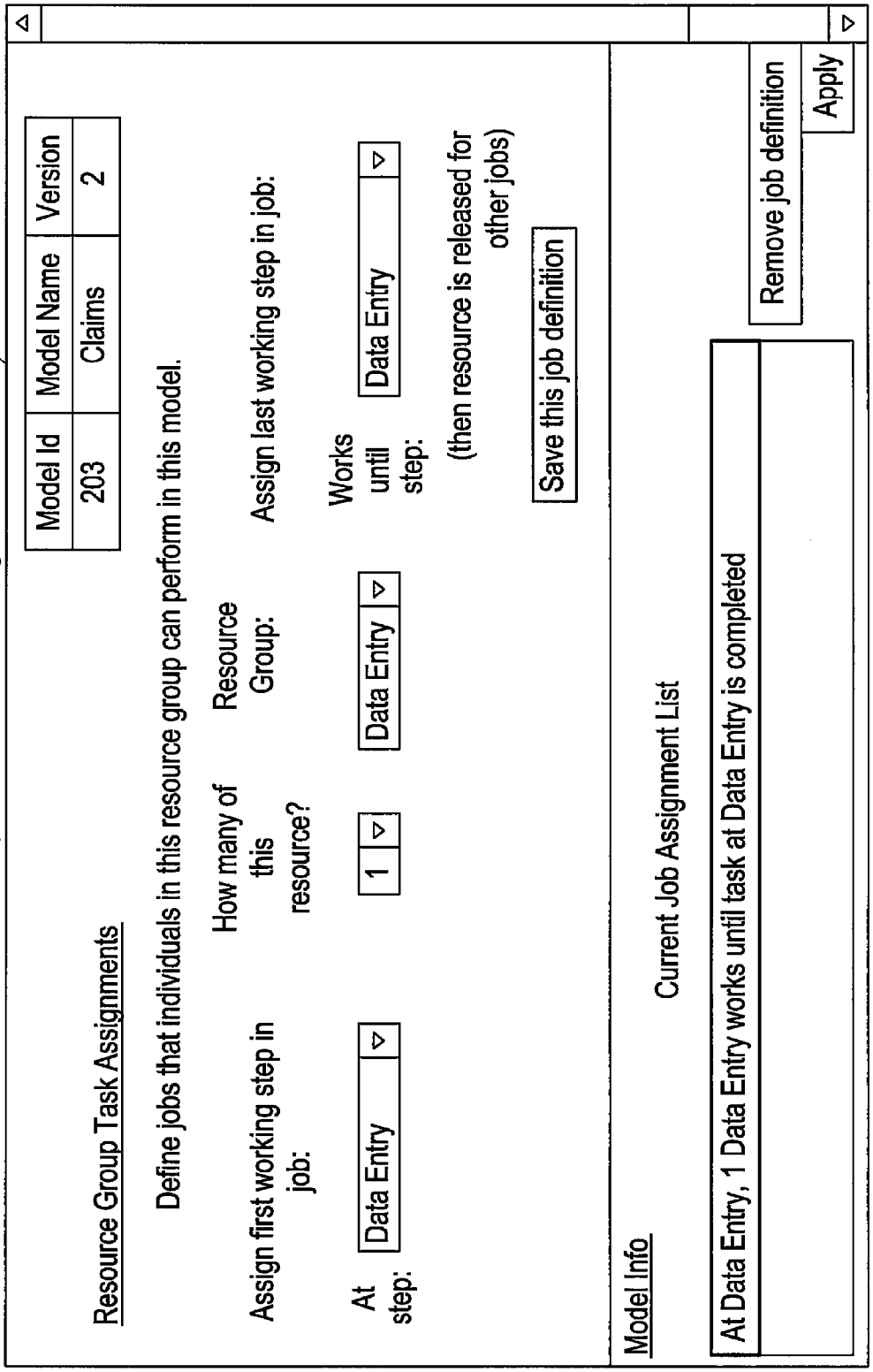
FIG. 23 is a user interface showing aspects of resource group task assignments in accordance with one embodiment of the invention.

FIG. 23 is a user interface showing aspects of resource group task assignments in accordance with one embodiment of the invention. That is, FIG. 23 allows a user to assign a first and last working step in a job, designate how many of the resource there are, and designate the resource group. The resource group task assignments in FIG. 23 are associated with a particular model number, as shown.

FIG. 24 is a user interface showing aspects of changing process steps in accordance with one embodiment of the invention. Specifically, FIG. 24 allows a user to add, delete or modify process steps. Further, FIG. 25 is a user interface that allows a user to change arrival patterns, i.e., in number and frequency, in accordance with one embodiment of the invention.

FIG. 26 is a user interface showing aspects of changing process flow and processing times in accordance with one embodiment of the invention. That is, as shown in FIG. 26, a user may select a process step, enter the processing time of that step, and designate where that processing step is added relative to other processing steps.

Figure 12:
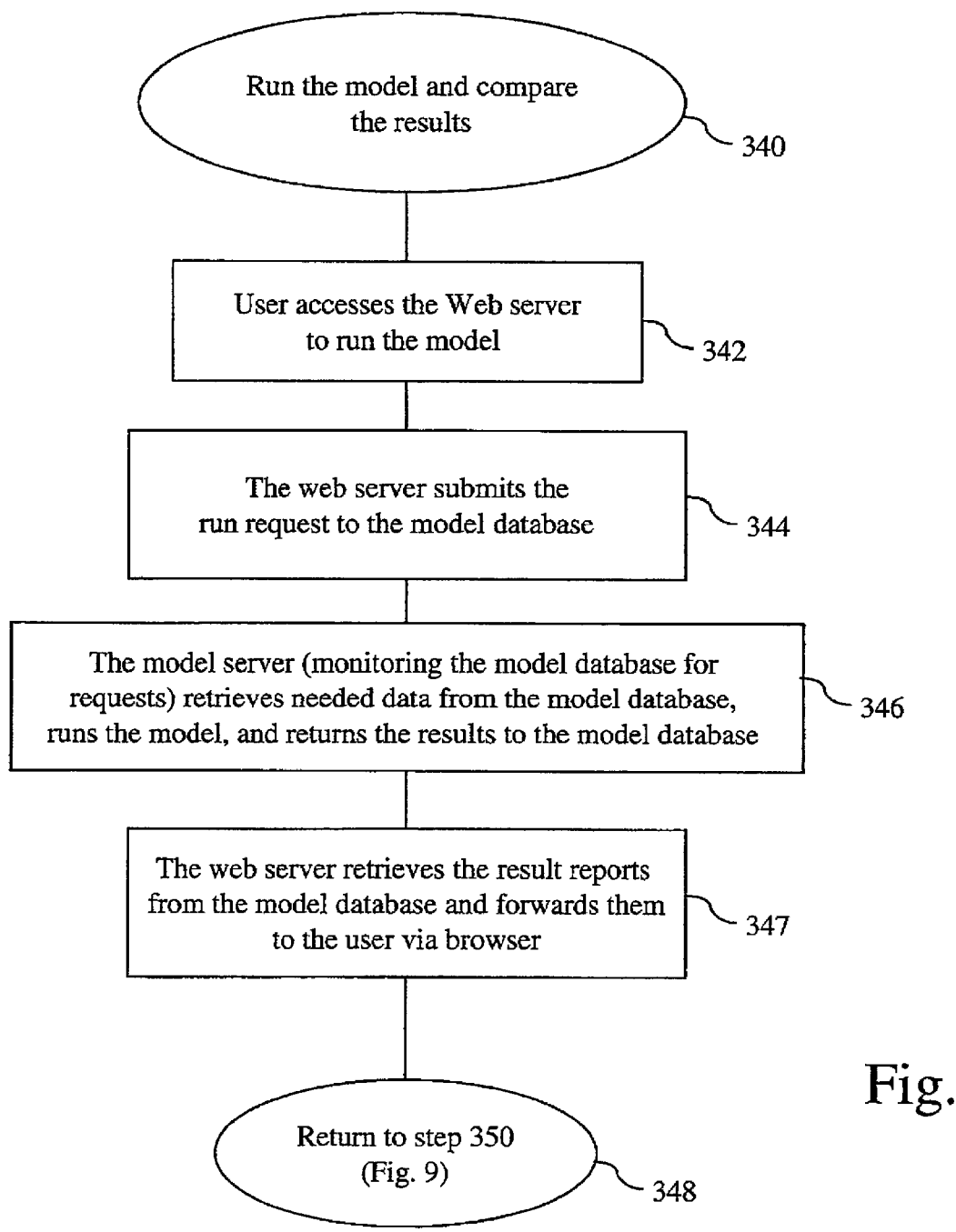
FIG. 12 is a flowchart showing in further detail the "run the model and compare the results" step of FIG. 9 in accordance with one embodiment of the invention.

FIG. 12 is a flowchart showing in further detail the "run the model and compare the results" step 340 of FIG. 9. As shown in FIG. 12, the process starts in step 340 and passes to step 342. In step 342, the user accesses the Web server to run the model, the user can set the run length (day, month, quarter, year) for the simulation by selecting one of the available options on the submit simulation screen. FIG. 27 shows a user interface illustrating aspects of this selection, in accordance with one embodiment of the invention. Then, in step 344, the web server submits the run request to the model database.

In response, in step 346, the model server, which monitors the model database for requests, retrieves the needed data from the model database, creates the required model input files and runs the model. Then, the model server returns the results to the model database.

After step 346, the process passes to step 347. In step 347, the user via the web server retrieves the result reports from the model database. For example, the user might view the results using a suitable browser. It should be appreciated that various models may be compared, as desired. FIG. 27 includes a user interface that may be used to select various models for comparison, in accordance with one embodiment of the invention. After step 347, the process passes to step 348. In step 348, the process returns to step 350 of FIG. 9.

Figure 28:
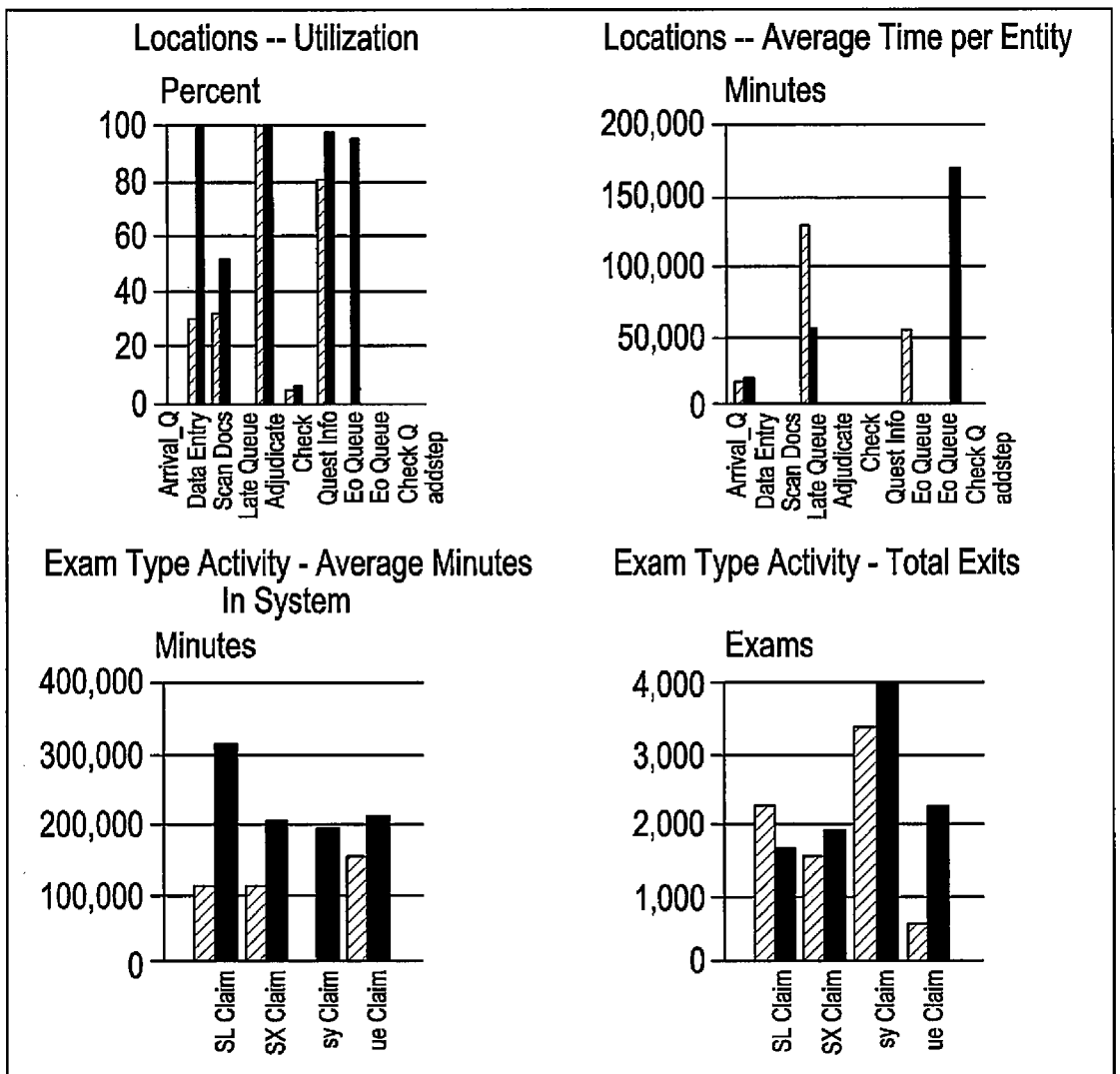
FIG. 28 is a user interface showing aspects of viewing results in accordance with one embodiment of the invention.
Figure 29:
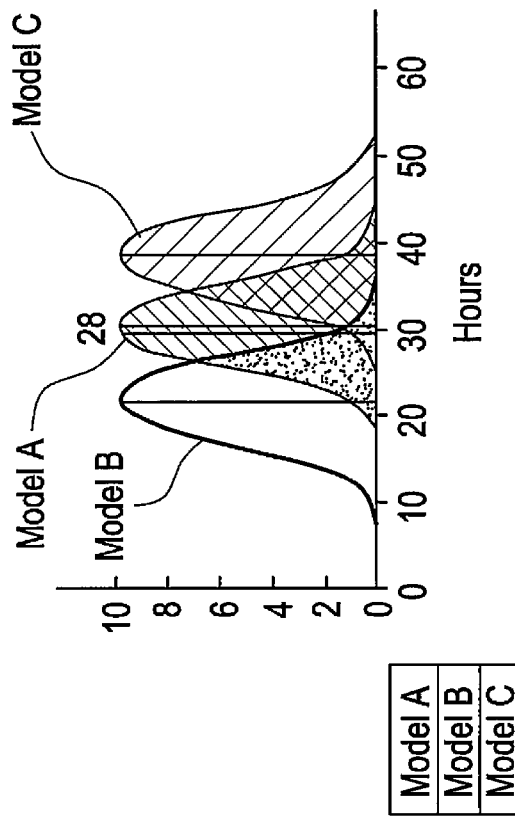
FIG. 29 is a user interface showing aspects of results provided by the system in accordance with one embodiment of the invention.

FIGS. 28 and 29 are user interfaces showing aspects of viewing results in accordance with one embodiment of the invention. As should be appreciated, any of a wide variety of information may be represented graphically and displayed to a user. As shown in FIG. 29, for example, an average cycle time is shown for three different models. This allows a user to easily compare the different models.

Various illustrative user interface screens are described herein and shown in the drawings. It should be appreciated that such screens are representative samples of possible user interface screens. However, changes can be made to the screens to target industry or user specific requests and/or to simplify interaction with the modeling system. Further, these changes would not require any changes to the underlying generic model database structures or the generic model engine. Simply put the interface can be tailored to specific requirements of a specific installation and use of the technology.

Figure 13:
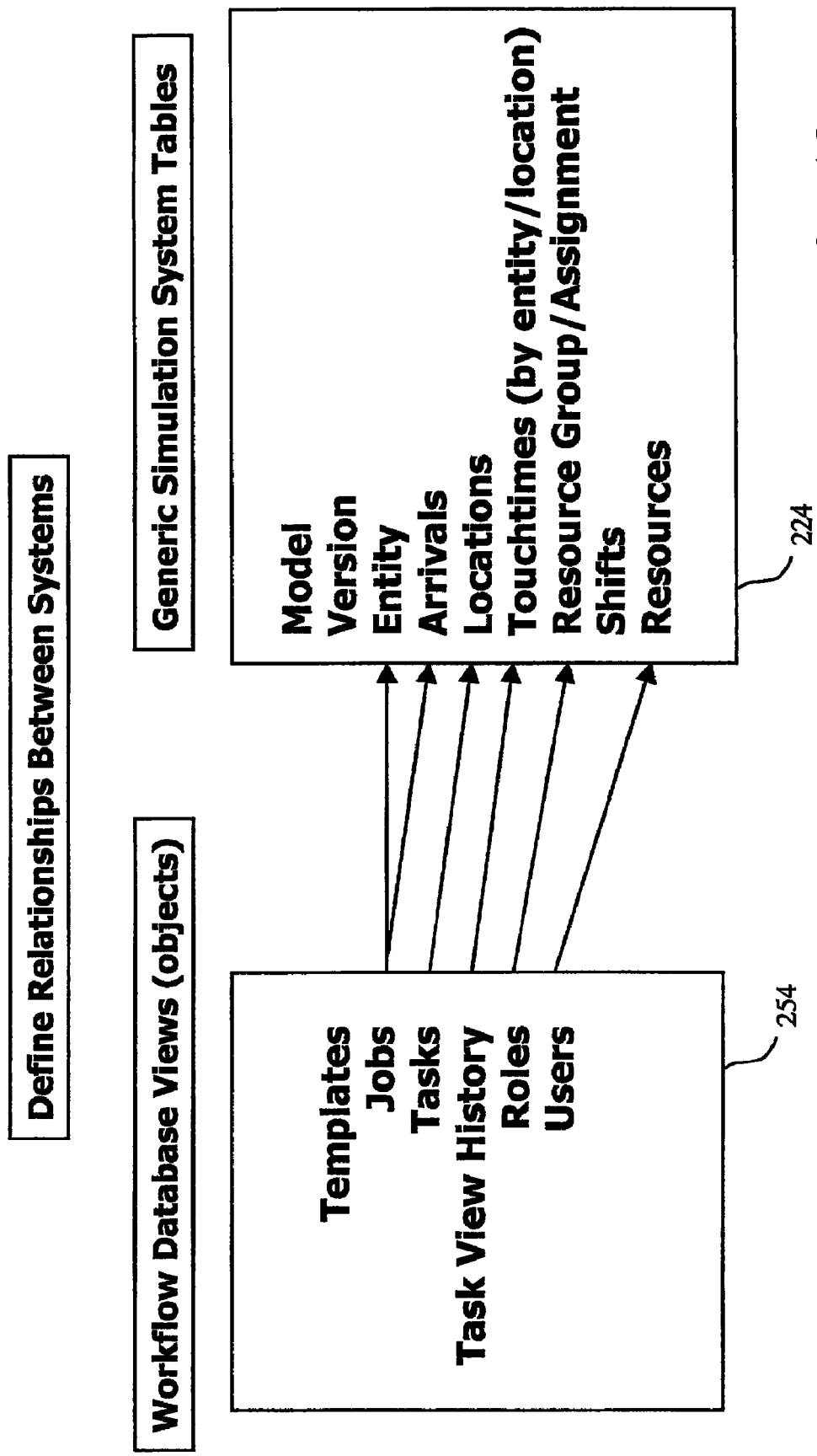
FIG. 13 is a diagram showing further aspects between information in a working business system and information in a modeling system in accordance with one embodiment of the invention.

FIG. 13 is a diagram showing further aspects between information in a working business system and in a modeling system in accordance with one embodiment of the invention. As should be appreciated, a wide variety of data, which may be contained in the business database system 250, may be used in generating a model 222 in the invention. Further, it is desirable that the data in the business database system 250 be appropriately mapped into corresponding data in the model 222. However, this mapping may be done in any of a variety of ways. FIG. 13 is a diagram illustratively showing the relationships between the business database system 250, specifically "workflow database views" (workflow objects 254) versus a model, and specifically the model elements 224 within the model.

As shown in FIG. 13, the workflow database objects 254 might include templates, jobs, tasks, task view history, roles, and/or users, for example. Further, the model elements 224 might include such parameters as model (the model number), version (the version of the model), entity, arrivals, locations, touchtimes (by entity/location), resource group/assignment, shifts and/or resources.

Figure 30:
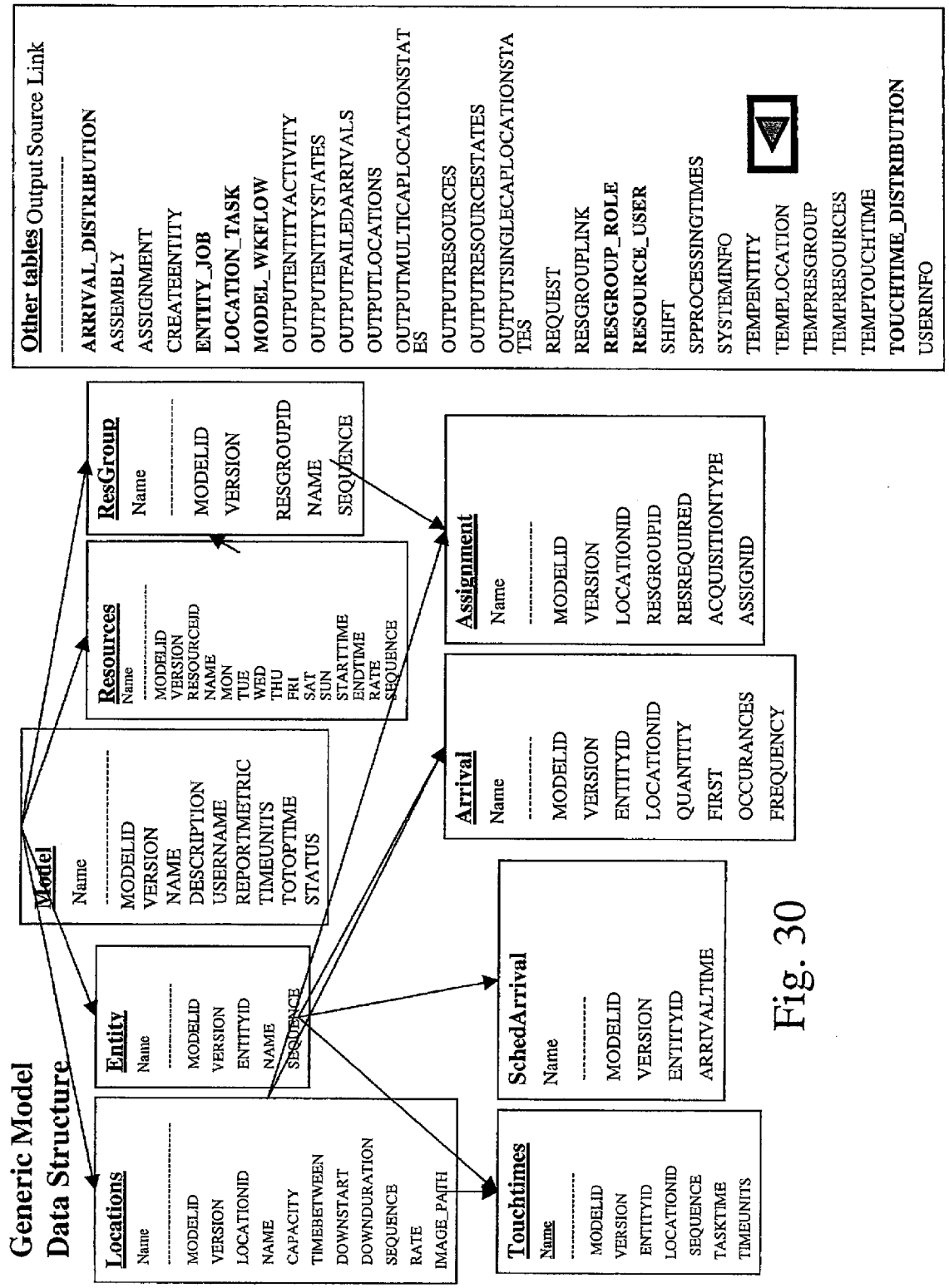
FIG. 30 is a pictorial representation of the structure and organization of the model database, illustrating the relationship between a plurality of tables containing entries which correspond to the task and resource parameters of a model template in accordance with one embodiment of the invention.

Similar to FIG. 4, FIG. 30 is a pictorial representation of the structure and organization of a model database, illustrating the relationship between a plurality of tables containing entries which correspond to the task and resource parameters of a model template in accordance with one embodiment of the invention. As shown in FIG. 30, mapping tables are included in the model database such that model database structure maintains the connection between the model elements and the business system database elements. An example table would be LOCATION_TASK as shown in FIG. 30. This table will maintain the linking between the ID assigned to a task in the business system database and the ID assigned the corresponding Location (task/process step) within the model database. Other examples are ENTITY_JOB, MODEL_WKFLOW, RESGROUP_ROLE, RESOURCE_USER, AND TOUCHTIME_DISTRIBUTION, for example. These tables are used to subsequently query the business database and update a model instance in the model database. They also provide a mechanism for identifying changes in the business system behavior between model updates. An example of a change may be the addition or deletion of users or roles being identified as well as identifying new entity types from jobs that do not match the recorded ENTITY_JOB types currently in the model database for this business system.

It should be appreciated that a well-designed model may be used to support a wide variety of business systems. In other words, a well-designed model may accommodate or be effectively mapped onto any of a variety of business systems. Illustratively, as shown in FIG. 13, the workflow object "jobs" is mapped onto both the model element "entity" and the model element "arrivals." FIG. 13 is intended to communicate some of the possible sources of business system data from a typical workflow system and how those sources can be utilized in the creation of a simulation model of that business process or system. USERS in a workflow system would be RESOURCES in a simulation model, ROLES would be used to identify RESOURCE GROUPS AND ASSIGNMENT in the simulation, and JOBS would be used to identify ENTITY TYPES, for example.

The mapping from the workflow objects 254 to the model elements 224 may be done in any of a variety of ways, as is desired, so as to effectively capture the operation of the real life business process in the model.

In accordance with one embodiment of the invention, the system of the invention automatically generates simulation model elements based on the workflow system history, i.e., the workflow objects 254. Further, the invention maintains the mapping for future model updates, as described above. As a result, a base model is established to perform analysis and planning in an effective and accurate manner.

Figure 14:
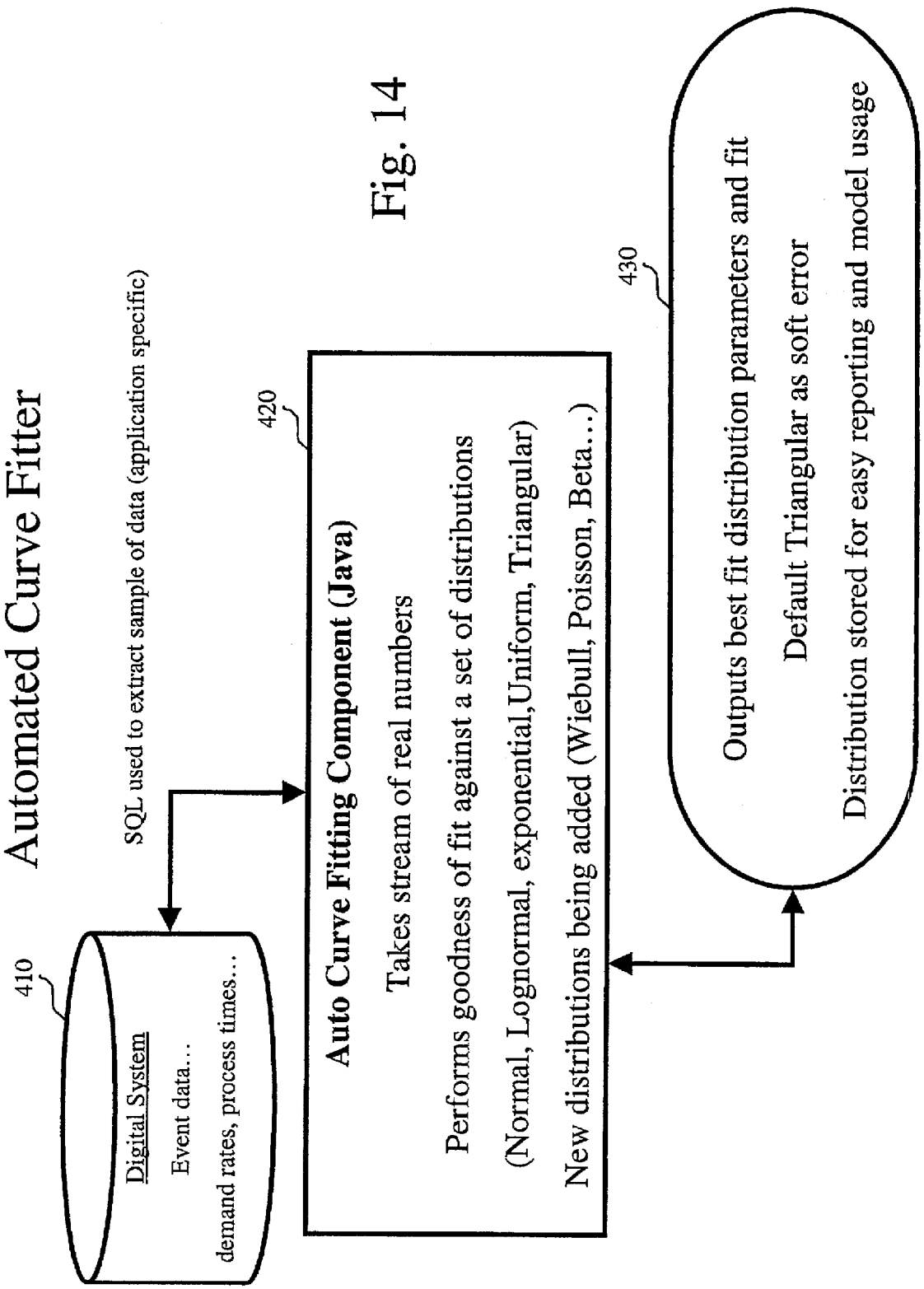
FIG. 14 is a diagram showing in further detail the processing performed by a curve fitting tool in accordance with one embodiment of the invention.

FIG. 14 is a diagram showing in further detail the processing performed by a curve fitting component 420, in accordance with one embodiment of the invention. That is, FIG. 14 shows a digital system 410 from which data is pulled and the curve fitting component 420. Further, FIG. 14 shows an output 430.

The data in the digital system 410 may include a variety of workflow objects or data types, such as event data, demand rates and/or process times, for example. The desired data in the digital system 410 is retrieved by a web server, as described above, and output to the curve fitting component 420 in a suitable manner. That is, the data may be output to the curve fitting component 420 in suitable files or in some other organized manner such that the curve fitting component 420 can determine the relationship between the data. The web server may retrieve the data from the digital system 410 using SQL database techniques or by any other suitable processing technique. The data, i.e., a data sample, may be application specific based on the particular needs of the model that is requested.

To further explain, in accordance with one embodiment of the invention, the curve fitting component 420, inputs the data from the digital system 410 as a stream of real numbers, i.e., a data set, for example. However, other methods may be used to output the data to the curve fitting component 420. The curve fitting component 420 then performs a "goodness of fit" test of the data against a set of distributions. The set of distributions, which may be utilized, include for example, normal, lognormal, exponential, uniform, triangular, as well as Weibull or Poisson, for example. Other known distributions used in known "goodness of fit" techniques may also be used, as is desired.

As a result, an output 430 is generated as shown in FIG. 14. The output 430 includes the best fit distribution parameters for a particular set of data, as well as the fit of the particular data around that distribution. For example, the default best fit distribution might be a "triangular" distribution.

A variety of sets of data may be processed by the curve fitting component 420. As a result of the processing, each data set is associated with a particular "best fit distribution." This distribution is then associated with the data and stored. The data set and the distribution that is associated with the data set may then be used for reporting purposes and for model usage.

Figure 15:
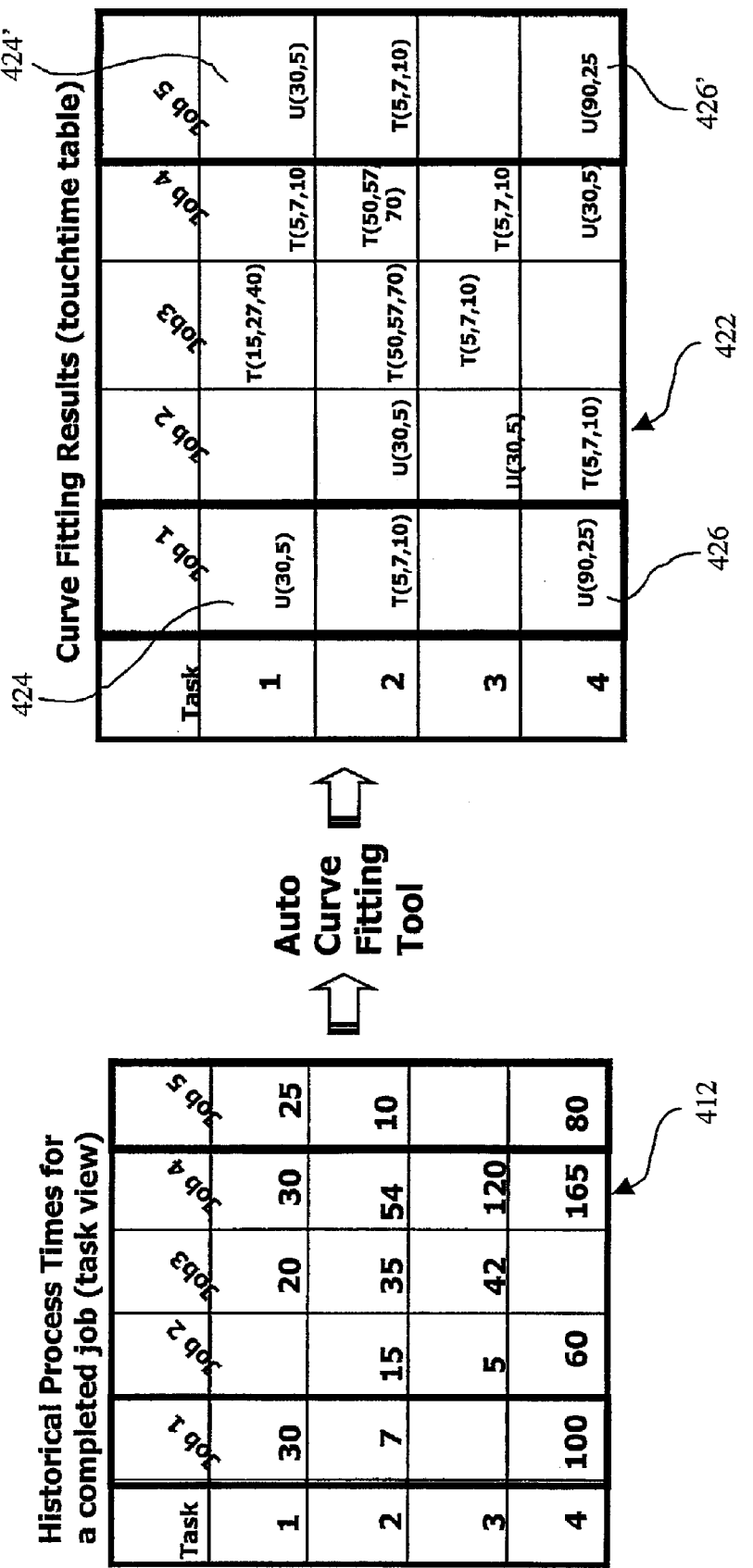
FIG. 15 is a diagram showing further aspects of operation of a curve fitter tool in accordance with one embodiment of the invention.

FIG. 15 is a diagram showing further aspects of operation of a curve fitter tool in accordance with one embodiment of the invention. In particular, FIG. 15 shows a historical process times table 412 and a curve fitting results table 422. The curve fitter portion 232 generates process time distributions, in accordance with one embodiment of the invention, based on a sample of historical data for a selected workflow, i.e., such as is shown in historical process times table 412. That is, the web server 230, for example, may determine which jobs employ the same process tasks, and further, characterize these as a same entity type. Further, process times may be generated based on entity types. This information is then provided to the curve fitter to determine the distributions.

To explain with reference to FIG. 15, similar job behaviors and/or sequences will determine entity types, and thereafter process times will be generated by entity type. For example, in FIG. 15, job 1 and job 5 in the historical process times table 412 employ the same tasks, i.e., tasks 1, 2 and 4. As a result, these two jobs (1, 5) may be characterized as an entity type. The curve fitter 232 generates a best fit distribution for each entity type, as well as for each task in a given entity type.

For example, as described above, jobs 1 and 5 are shown in FIG. 15 as being the same entity type. As a result, cell 424 and cell 424' in the curve fitting results table 412 possess the same distribution. In a similar manner, cell 426 and cell 426' in the curve fitting results table 412 possess the same distribution.

This approach to operation of the curve fitter portion 232 improves the accuracy of the model, as well as helps segment flow by job types. Further, the approach illustrated by FIG. 15 provides segmented and targeted output metrics. These metrics may then be effectively used in the modeling process In accordance with one embodiment of the invention, each Entity type will have associated with it as part of the model output a cycle time (the total time it takes to process), distribution and throughput (total quantity processed) distribution. The entity type associated with jobs 1 and 5 in table 412, as shown in FIG. 15, may have different performance metrics than jobs of different entity types. This ability to segment work types being processed and model them accurately, allows the user to assess the impact of changes in demand mix as well as help them identify and test alternative processing procedures for different types of work, i.e., such as routing some types to different tasks or dedicating resources to particular types at certain tasks, for example. This provides them with an effective way of weighing alternative system configurations to meet a complex set of performance metrics that may be associated with a complex dynamic business system.

In summary, the various embodiments of the invention provide various features and functionality to effectively use digitized business data in the generation of models. The invention provides a web based generic process simulation engine and a database construct for defining any business process for simulation modeling. A server based method simulates the data construct with a pre-developed simulation model. Further, a web based interface allows for building alternative process configuration models, submitting models for analysis, and reporting capabilities for analyzing process changes.

The invention provides methods for intelligent interrogation of digitized business systems. This interrogation is performed by a set of queries and algorithms that extract the business system behavior, and create an instance of a generic simulation model. An automated curve fitting mechanism is used in accordance with some embodiments of the invention. This system component is integrated with the intelligent system interrogation to generate processing times and arrival rates based on data samples extracted from the digitized system.

Accordingly, various advantages are provided by the invention. The invention provides automated business system simulation model development and allows for easy comparison of system alternatives. The models used in the invention are highly accurate because actual digital system data is used to generate processing times and arrival rates, for example. The system of the invention allows for 6 sigma process design. Also, the invention provides analysis and control via the web browser that is integrated with the operational digitized business systems. Of note, the practice of the invention by a user, as described above, requires no programming knowledge and requires only a web browser to access the system, in accordance with one embodiment of the invention.

As discussed further below, it should be appreciated that the method in accordance with one embodiment of the invention may be implemented on any of a wide variety of computer mediums. That is, a computer readable medium may be used to simulate a process of discrete tasks having a plurality of available resources associated therewith, as described above. In accordance with one embodiment of the invention, the computer readable medium includes a first portion that stores a plurality of models in a model database, each model including a plurality of task and resource parameters. Further, a second portion may be provided that communicates with a user, the second portion in communication with the first portion and configured to receive commands from the user, to retrieve one of the plurality of models and corresponding task and resource parameters in response to a user command, to receive input data corresponding to attributes of one or more task and resource parameters from a business database system, and to generate a simulation model based on the selected business system and the input data. Also, the computer readable medium may include a third portion that performs a simulation of the process by processing the simulation model, and that generates an output data file containing output data representative of the simulation.

As described above, various embodiments of the system of the invention are set forth. Further, FIGS. 9-12, as well as other figures, show various steps of various embodiments of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

The invention provides a system to simulate a process of discrete tasks having a plurality of available resources associated therewith and processing a plurality of work items or entity types. The system may comprise a model database to store a plurality of models, each model including a plurality of entity types, task and resource parameters. The system may further include a model portion user interface in communication with the model database and configured to receive commands from a user, to retrieve one of the plurality of models and corresponding entity, task and resource parameters in response to a user command.

The invention can receive input data corresponding to attributes of one or more entity, task and resource parameters from a business database system, and can generate a simulation model automatically based on the selected business system data. The system may further record and maintain links between the model database and the digitized business system database to augment future updates of the model database with new data samples from the business system databases. The invention may further maintain the history of distribution generated for a business system model there by identifying changes in task performance or entity type arrival patterns. The system may further provide an ability to alter the arrangement and relationships between the various model elements (entities, tasks and resources) to define new job descriptions, resource schedules, new workflows, and completely distinct alternative business system configurations, for example.

The system may further include a model server to perform a simulation of the process by processing a "generic" simulation model utilizing the stored process description in the process model database and to generate an output data file containing output data representative of the simulation. The system may further provide the ability to compare several distinctly different business system configuration model results to determine the best alternative to maximize business system performance. The system is intended to be used by business process owners/managers and does not require programming experience or simulation modeling expertise.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A healthcare process simulation system, the system including:
    a user interface adapted to receive input from a user and adapted to provide output to the user;
    a database including a model template comprising a predefined representation of tasks for a process;
    a modeling component adapted such that the user can generate a simulation model using the user interface, wherein the simulation model is based at least in part on the model template; and
    a simulation engine adapted to simulate a healthcare process based at least in part on the simulation model, wherein the healthcare process simulation includes allocating a resource from a resource dataset to a task in the simulation model based at least in part on an efficiency factor associated with the resource, and wherein the simulation engine is adapted to provide output about the simulation to the user through the user interface.

2. The system of claim 1, wherein the model template is based at least in part on a previously simulated model.

3. The system of claim 1, wherein the simulation model includes at least one parameter, and wherein the user configures at least one attribute of the at least one parameter.

4. The system of claim 1, wherein the healthcare process is a medical imaging process.

5. A method for generating a simulation model for a healthcare process, the method including:
    selecting a model template wherein the model template is a predefined representation of tasks for a healthcare process, the model template includes at least one parameter, wherein each parameter is associated with at least one attribute;
    creating a simulation model based on the selected model template, wherein the simulation model initially has the same configuration as the selected model template;
    adjusting at least one attribute of the at least one parameter of the simulation model; and
    allocating a resource from a resource dataset to a task in the simulation model based at least in part on an efficiency factor associated with the resource.

6. The method of claim 5, wherein the model template is selected from a database.

7. The method of claim 5, wherein the model template is selected by a user.

8. The method of claim 5, wherein the at least one attribute is adjusted by a user.

9. The method of claim 5, wherein the at least one resource is allocated by a modeling component.

10. The method of claim 5, further including simulating the generated simulation model.

11. The method of claim 10, further including adjusting at least one attribute of the simulation model based at least in part on the results of the simulation step.

12. The method of claim 10, wherein the simulation step includes processing the simulation model using a goodness of fit technique.

* * * * *